United States Patent
Schmidt et al.

(10) Patent No.: US 9,604,197 B2
(45) Date of Patent: Mar. 28, 2017

(54) CRYSTALLINE MOLECULAR SIEVES AND RELATED STRUCTURE-DIRECTING AGENTS, METHODS AND SYSTEMS

(71) Applicant: CALIFORNIA INSTITUTE OF TECHNOLOGY, Pasadena, CA (US)

(72) Inventors: Joel E. Schmidt, Pasadena, CA (US); Mark E. Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 291 days.

(21) Appl. No.: 14/517,793

(22) Filed: Oct. 17, 2014

(65) Prior Publication Data

US 2015/0110712 A1    Apr. 23, 2015

Related U.S. Application Data

(60) Provisional application No. 61/892,980, filed on Oct. 18, 2013.

(51) Int. Cl.
| | | |
|---|---|---|
| *C01B 39/48* | (2006.01) | |
| *B01J 20/30* | (2006.01) | |
| *B01J 20/18* | (2006.01) | |
| *B01J 29/70* | (2006.01) | |
| *B01J 35/00* | (2006.01) | |
| *C01B 37/02* | (2006.01) | |

(52) U.S. Cl.
CPC ........... *B01J 20/3085* (2013.01); *B01J 20/18* (2013.01); *B01J 29/70* (2013.01); *B01J 35/002* (2013.01); *C01B 37/02* (2013.01); *C01B 39/48* (2013.01)

(58) Field of Classification Search
CPC   C01B 37/02; C01B 39/48; B01J 29/70; B01J 20/18
See application file for complete search history.

(56) References Cited

U.S. PATENT DOCUMENTS

| 4,483,835 A | 11/1984 | Zones |
|---|---|---|
| 4,910,006 A | 3/1990 | Zones et al. |
| 5,316,753 A | 5/1994 | Nakagawa |
| 6,960,327 B2 | 11/2005 | Navrotsky et al. |
| 7,138,099 B1 | 11/2006 | Zones et al. |
| 2010/0260665 A1 | 10/2010 | Archer et al. |
| 2015/0110712 A1* | 4/2015 | Schmidt .................. C01B 37/02  423/706 |

(Continued)

OTHER PUBLICATIONS

Rojas, et al., "Synthesis, Structure, and Optical Activity of IIPM-1, 34-36 a Pure Silica Chiral Zeolite", Journal of the American Chemical Society, Jul. 18, 2013, vol. 135(32), pp. 11975-11984.

(Continued)

*Primary Examiner* — David M Brunsman
(74) *Attorney, Agent, or Firm* — Baker & Hostetler LLP

(57) ABSTRACT

A composition and method for preparing molecular sieves having a STW framework structure are described wherein a structure directing agent comprising quaternary cation 1,2,3,4,5-pentamethyl-1H-imidazol-3-ium is contacted with a source of an oxide of a first tetravalent element with or without a source of an oxide of another tetravalent elements and/or a source of a trivalent element in a molar ratio of tetravalent element:trivalent element 100:1 and greater.

42 Claims, 16 Drawing Sheets

(56) References Cited

U.S. PATENT DOCUMENTS

| | | | |
|---|---|---|---|
| 2015/0202603 A1* | 7/2015 | Schmidt | B01J 29/70 585/640 |
| 2015/0202612 A1* | 7/2015 | Schmidt | B01J 29/70 585/640 |
| 2015/0203357 A1* | 7/2015 | Schmidt | B01J 29/70 252/183.14 |
| 2015/0203358 A1* | 7/2015 | Schmidt | B01J 29/70 585/640 |

OTHER PUBLICATIONS

Schmidt, et al., "Synthesis of a Specified, Silica Molecular Sieve 1-3,22-27,34-36 by Using Computationally Predicted Organic Structure-Directing Agents", Angewandte Chemic, Jun. 24, 2014, vol. 126(32), pp. 8512-8514.

Davis, M.E., "Ordered porous materials for emerging applications" *Nature* 417 (2002): p. 813-821.

Framework Type STW. Available from: www.iza-structure.org/databases [retreived Oct. 16, 2014].

Pophale, R. et al. "Computational prediction of chemically synthesizable organic structure directing agents for zeolites" *Journal of Materials Chemistry A*, 1 (2013): p. 6750-6760.

Moliner, M. et al. "Towards the rational design of efficient organic structure-directing agents for zeolite synthesis" *Angew Chem Int Ed Engl*, 52 (2013): pp. 13880-13889.

Pophale, R. et al."A database of new zeolite-like materials" *Phys Chem Chem Phys*, (2011) 13: pp. 12407-12412.

Vermeiren, W. et al. "Impact of zeolites on the petroleum and petrochemical industry" *Topics in Catalysis*, 52 (2009): pp. 1131-1161.

Zones, S. et al. "Translating new materials discoveries in zeolite research to commercial manufacture" *Microporous and Mesoporous Materials*, 144 (2011): pp. 1-8.

Lin, L.C., et al., "In silico screening of carbon-capture materials" *Nature Materials* 11 (2012): pp. 633-641.

Rojas, A. et al. "A pure silica chiral polymorph with helical pores" *Angew Chem Int Ed Engl* 51 (2012): pp. 3854-3856.

Tang, L., et al., "A zeolite family with chiral and achiral structures built from the same building layer" *Nature Materials*, 7 (2008): pp. 381-385.

Nakagawa, Y., et al. "Guest/host relationships in zeolite synthesis: ring-substituted piperidines and the remarkable adamantane mimicry by 1-azonio spiro [5.5] undecanes" *Microporous and Mesoporous Materials* 22 1998: pp. 69-85.

Hathaway, P.E. et al. "High resolution, quasi-equilibrium sorption studies of molecular sieves" *Catalysis Letters* 5 (1990): pp. 333-347.

Rojas, A., et al., "Synthesis, structure, and optical activity of HPM-1, a pure silica chiral zeolite" *J Am Chem Soc* 135 (2013): pp. 11975-11984.

Camblor, M.A. et al. "Synthesis of all-silica and high-silica molecular sieves in fluoride media" *Topics in Catalysis* 9 (1999): pp. 59-76.

* cited by examiner

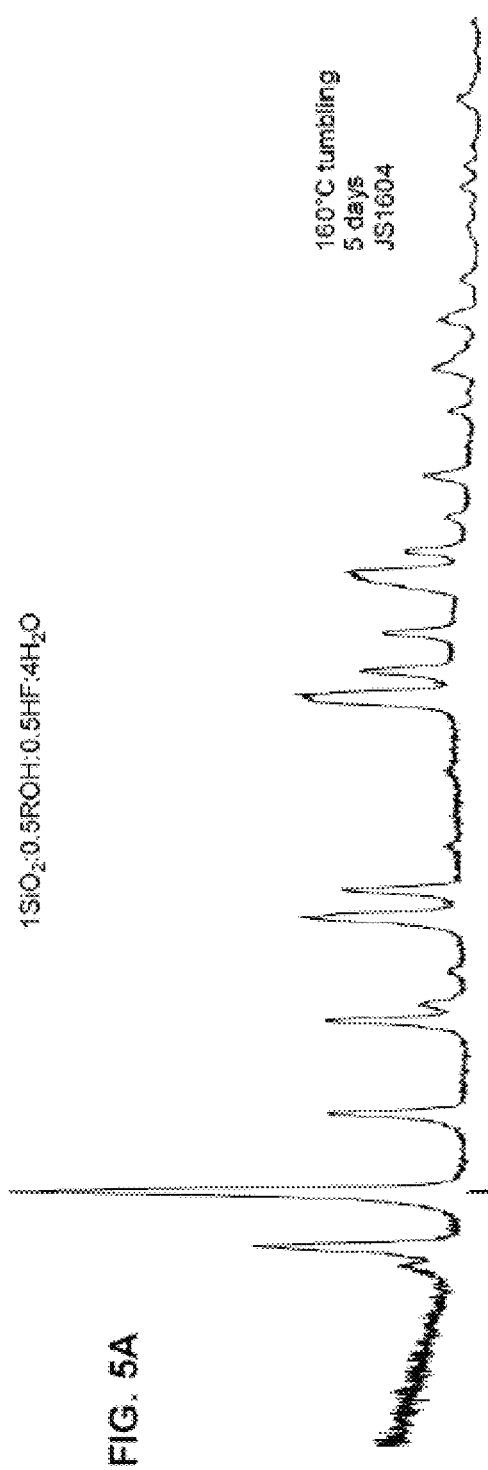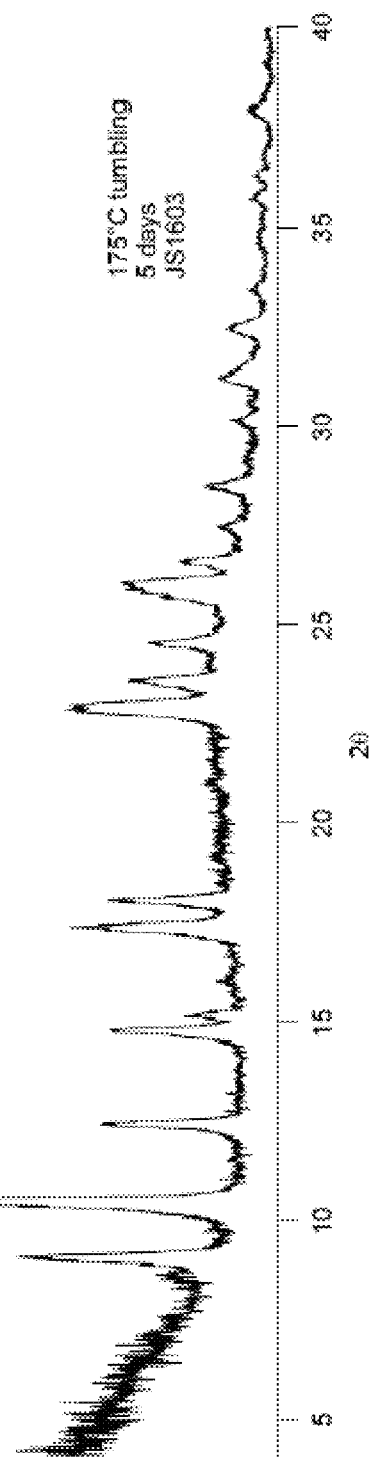
FIG. 5A
FIG. 5B

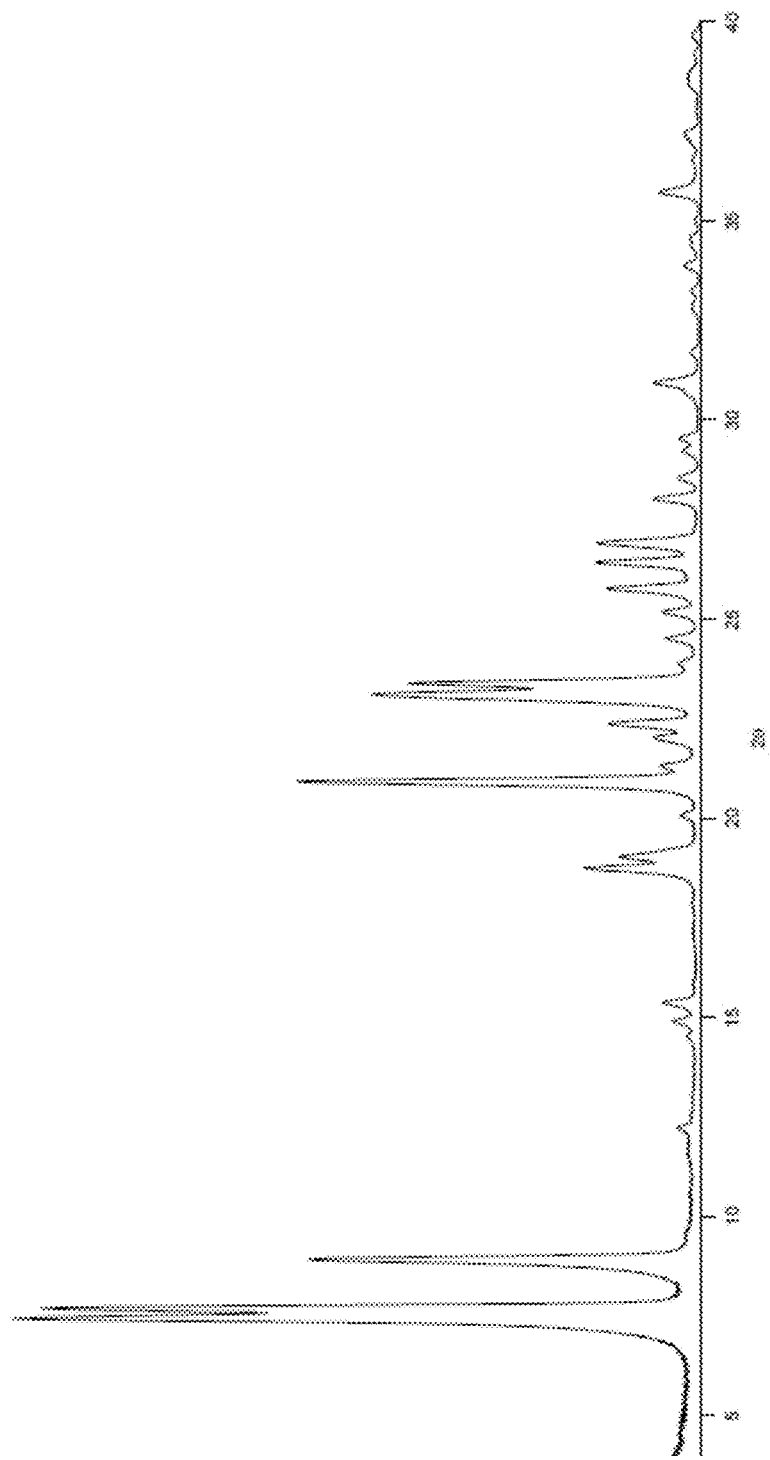

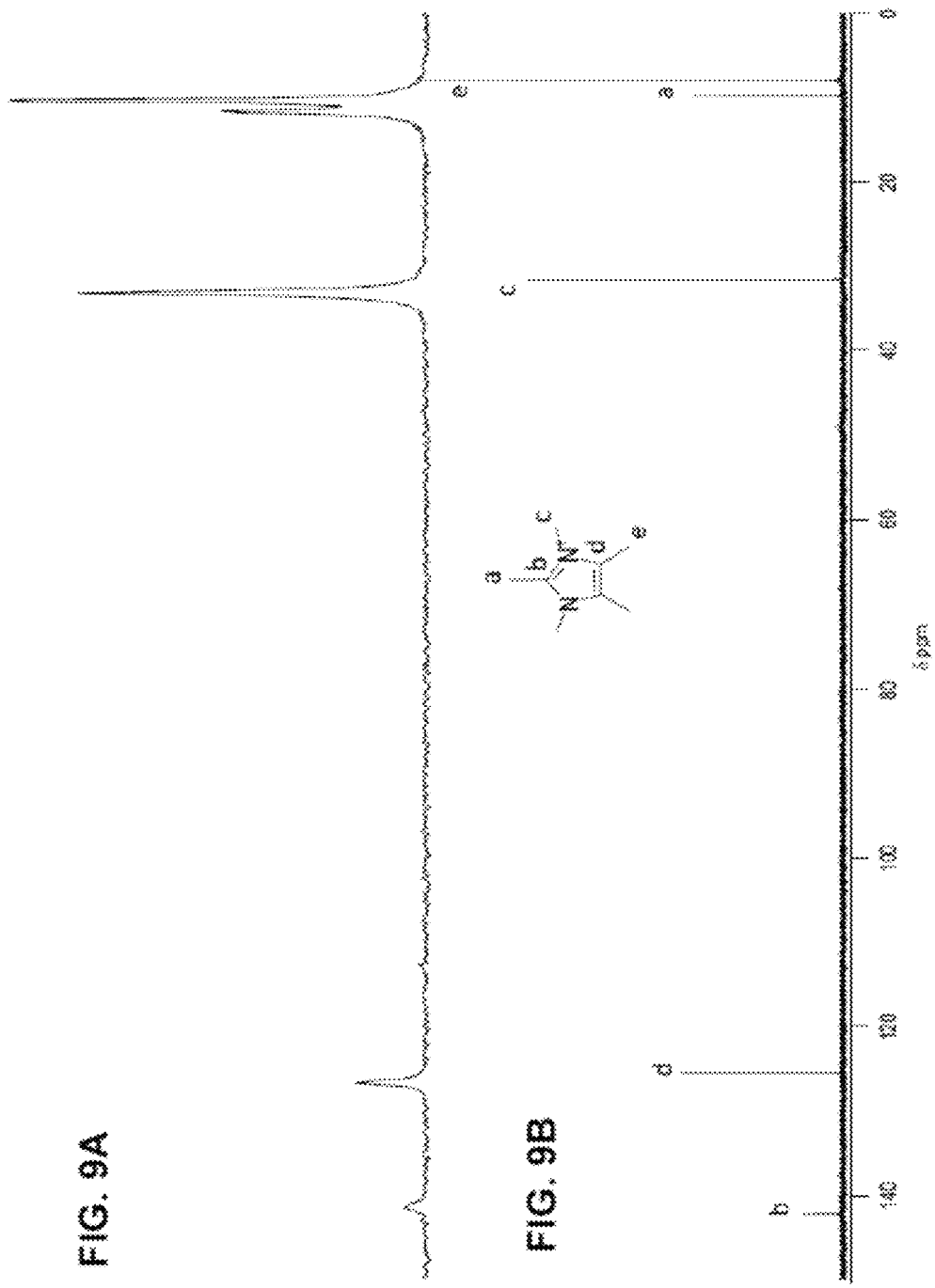

CRYSTALLINE MOLECULAR SIEVES AND RELATED STRUCTURE-DIRECTING AGENTS, METHODS AND SYSTEMS

CROSS REFERENCE TO RELATED APPLICATIONS

This application claims the benefit of priority under 35 USC §119(e) of U.S. Provisional Application Ser. No. 61/892,980 filed Oct. 18, 2013 and entitled "Crystalline Molecular Sieves and Structure-Directing Agents", the disclosure of which is incorporated herein by reference in its entirety. The present application is also related to International application Serial No. PCT/US14/61270 entitled "Crystalline Molecule Sieves and Relates Structure Directing Agents, Methods and System" filed on Oct. 17, 2014 and herein incorporated by reference in its entirety.

FIELD

The present disclosure relates to molecular sieves and related methods and organic structure directing agents. In particular, the present disclosure relates to crystalline molecular sieves and related structure directing agents, methods and systems.

BACKGROUND

Molecular sieves are a class of important materials used in the chemical industry for processes such as gas stream purification and hydrocarbon conversion processes. Molecular sieves are porous solids having interconnected pores of same or different sizes. Molecular sieves typically have a one-, two- or three-dimensional crystalline pore structure having pores of one or more molecular dimensions that selectively adsorb molecules that can enter the pores, and exclude those molecules that are too large. The pore size, pore shape, interstitial spacing or channels, composition, crystal morphology and structure are a few characteristics of molecular sieves that determine their use in various hydrocarbon adsorption and conversion processes.

SUMMARY

Provided herein are molecular sieves and related methods, systems and structure directing agents. In particular as-synthesized molecular sieves with STW framework are described prepared with an organic structure directing agent (OSDA) and related methods and systems.

According to a first aspect a method and system for preparing an as-synthesized molecular sieve with a STW framework, and related composition mixture are described. The method comprises preparing a reaction mixture and maintaining the reaction mixture for a time and under conditions to form crystals of the molecular sieve with STW framework. In the method the reaction mixture comprises an organic structure directing agent comprising a quaternary cation (1);

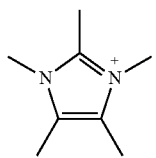

(1)

a source of an oxide of a first tetravalent element, optionally a source of fluoride, a seed crystal of the molecular sieve and/or a source of an oxide of a second tetravalent element. The system comprises two or more of: an organic structure directing agent comprising a quaternary cation (1) an organic or an inorganic anion, at least one source of an oxide of a first tetravalent element, at least one source of a second oxide of a second tetravalent element and a source of fluoride, and optionally a seed crystal of the molecular sieve for simultaneous combined or sequential use in the method herein described.

According to a second aspect, an as-synthesized molecular sieve with a STW framework is described. The as-synthesized molecular sieve is prepared by a method comprising: preparing a reaction mixture comprising: a structure directing agent comprising a quaternary cation (1) and an organic or an inorganic anion and an organic or an inorganic anion;

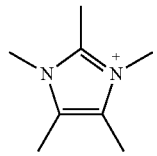

(1)

a source of an oxide of a first tetravalent element selected from silicon, germanium, titanium, tin, zirconium, cerium and hathium, a source of an oxide of a second tetravalent element selected from germanium, titanium, tin, zirconium, cerium and hafnium, and optionally a source of fluoride, and/or a seed crystal of the molecular sieve wherein when the first tetravalent element is silicon and the second tetravalent element is germanium, the ratio in the reaction mixture between the first tetravalent element and the second tetravalent elements is equal to or higher than about 1:10, and in particular in a range of first tetravalent element: second tetravalent element ratios of from about 1:10 to about 10:1, from about 1:4 to about 4:1 or from about 1:2 to about 3:2, or about 2:1. The method further comprises maintaining the reaction mixture for a time and under conditions to form crystals of the molecular sieve with STW framework. The system comprises two or more of: an organic structure directing agent comprising a quaternary cation (1), a source of an oxide of a first tetravalent element, a source of an oxide of a second tetravalent element and optionally a source of fluoride and/or a seed crystal of the molecular sieve.

According to a third aspect a method and system for preparing an as-synthesized molecular sieve with a STW framework, and related composition mixture are described. the method comprising: preparing a reaction mixture comprising: a structure directing agent comprising a quaternary cation (1) and an organic or an inorganic anion;

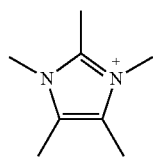

(1)

a source of a first oxide selected from a group consisting of oxides of tetravalent elements; a source of a second oxide selected from a group consisting of oxides of trivalent elements, with a molar ratio of the tetravalent element to the trivalent equal to or higher than 100, and optionally a source of a third oxide selected from the group consisting of oxides of tetravalent elements and/or a seed crystal of the molecular sieve. The method further comprises maintaining the reaction mixture for a time and under conditions to form crystals of the molecular sieve with STW framework. The system comprises two or more of: a structure directing agent comprising a quaternary cation (1), an organic or an inorganic anion source of a first oxide selected from a group consisting of oxides of tetravalent elements; a source of a second oxide selected from the group consisting of oxides of trivalent valent elements and optionally a source of a third oxide selected from the group consisting of oxides of tetravalent elements, for simultaneous combined or sequential use in the method herein described.

According to a fourth aspect, an as-synthesized molecular sieve with a STW framework is described. The as-synthesized molecular sieve is prepared by a method comprising: preparing a reaction mixture comprising: an organic structure directing agent comprising a quaternary cation (1) and an organic or an inorganic anion,

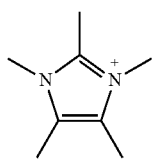

(1)

a source of a first oxide selected from a group consisting of oxides of tetravalent elements, a source of a second oxide selected from a group consisting of oxides of trivalent element and tetravalent element, wherein the molar ratio of the tetravalent element to the trivalent element is equal to or higher than 100, optionally a source of a third oxide selected from the group consisting of oxides of tetravalent elements and/or a seed crystal of the molecular sieve. The method further comprises maintaining the reaction mixture for a time and under conditions to form crystals of the molecular sieve with STW framework.

The organic structure directing agent herein described and related compositions methods and systems allow in several embodiments formation of STW with a reduced timing with respect to other methods known in the art.

The organic structure directing agent herein described and related compositions methods and systems allow in several embodiments formation of STW across wide composition range which is known or expected to comprise various tetravalent elements alone or in combination with trivalent elements with a molar ratio of the tetravalent element to the trivalent element is 100:1 or greater.

The molecular sieves, methods and systems herein described and related compositions can be used in connection with applications wherein use of molecular sieves is desired including, for example, purification of gas streams; separations such as the removal of water, the removal of starting materials, and the separation of small molecules; and as catalysts such as catalysts for the conversion of methanol to olefins, or for the reduction of nitrous oxides especially in exhaust applications. Exemplary applications comprise industrial chemistry applications, petroleum industry, and other applications that will be apparent to the skilled person upon a reading of the present disclosure.

The details of one or more embodiments of the disclosure are set forth in the accompanying drawings and the description below. Other features and objects will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

In FIG. 4B the powder X-ray diffraction patterns of a pure silica STW produced with OSDA 2 (indicated as CM7-2) is shown.

FIGS. 5A and 5B show powder X-ray diffraction patterns of a pure silica STW produced with 1,2,3,4,5-pentamethyl-1H-imidazol-3-ium (1) at two different temperatures. In particular in FIG. 5A the powder X-ray diffraction patterns of a pure silica STW produced at 160° C. is shown. In FIG. 5B the powder X-ray diffraction patterns of a pure silica STW produced with 1,2,3,4,5-pentamethyl-1H-imidazol-3-ium (1) at 175° C. is shown.

In FIG. 6B the powder X-ray diffraction patterns of a germanosilicate STW produced with 1,2,3,4,5-pentamethyl-1H-imidazol-3-ium (1) at 160° C. for 3 days is shown.

FIG. 8A to FIG. 8F show representative powder X-ray diffraction patterns of as-made materials. In particular, FIG. 8A shows the powder X-ray diffraction patterns of an ITW molecular sieve. FIG. 8B shows the powder X-ray diffraction patterns of an MFI. FIG. 8C shows the powder X-ray diffraction patterns of an, MTW molecular sieve. FIG. 8D shows the powder X-ray diffraction patterns of an STF molecular sieve. FIG. 8E shows the powder X-ray diffraction pattern of an STW molecular sieve. FIG. 8F shows the powder X-ray diffraction pattern of an HPM-2 molecular sieve [56].

FIGS. 9A and 9B show two NMR spectra showing inclusion of the 1,2,3,4,5-pentamethyl-1H-imidazol-3-ium (1) within the STW molecular sieve. In particular, FIG. 9A shows the $^{13}$C CP-MAS NMR spectrum of the 1,2,3,4,5-pentamethyl-1H-imidazol-3-ium (1) in the produced STW molecular sieve. FIG. 9B shows the $^{13}$C liquid NMR (D$_2$O) of the 1,2,3,4,5-pentamethyl-1H-imidazol-3-ium (1).

DETAILED DESCRIPTION

Figure 1:
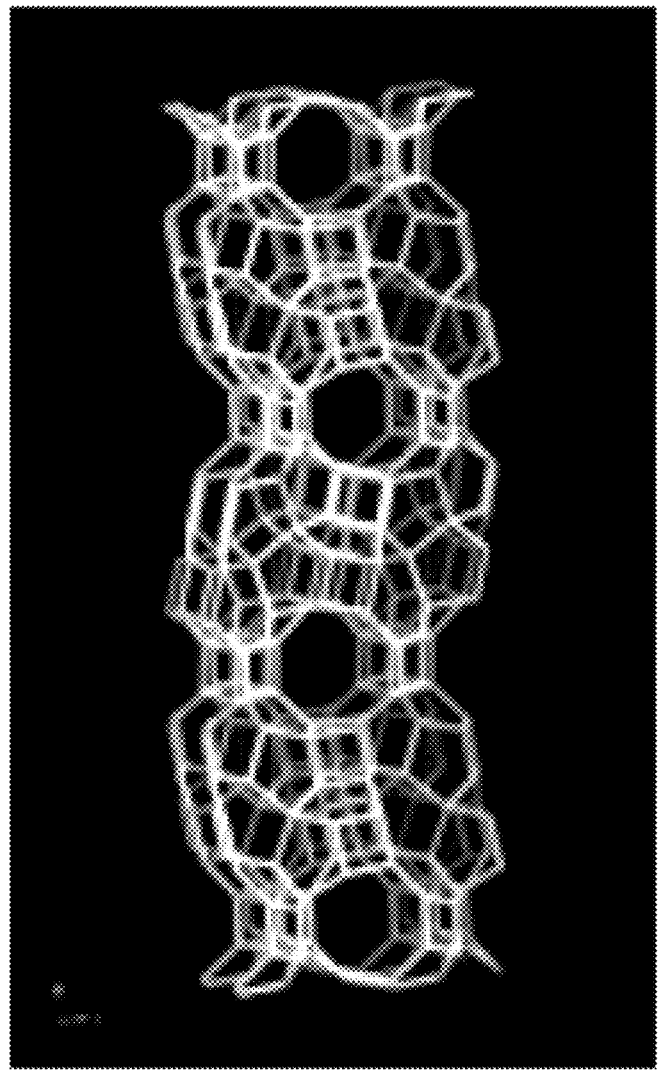
FIG. 1 shows a schematic illustration of an exemplary STW framework in accordance with the Structure Commission of the International Zeolite Association.

Provided herein are molecular sieves with a STW framework and related methods, systems and structure directing agents. In particular as-synthesized molecular sieves with STW framework are described and prepared with an organic structure directing agent comprising an imidazolium cation, at least in some embodiments across generally a wider range of conditions and in less time with respect to other procedures identifiable by a skilled person.

The term "molecular sieve" indicates a porous solid having interconnected pores of same or different sizes, and includes (a) intermediate and (b) final or target molecular sieves and molecular sieves produced by (1) direct synthesis or (2) post-crystallization treatment (secondary synthesis). Exemplary molecular sieves comprise crystalline, microporous materials (e.g. pores less than 2 nm) that comprise three-dimensional networks of oxide tetrahedra. Typically, molecular sieves present a specificity in the structure-property relationships which can be used to select an appropriate molecular sieves for one or more specific applications [1]. At present, over 200 different frameworks have been identified [2] [3] [4] and fewer than 10% are in commercial use [5] [6]. As an example of the utility within these possible frameworks, recent studies on carbon capture have identified numerous frameworks with calculated performance superior to known materials [7].

Molecular sieves of the present disclosure comprise synthetic molecular sieves such as germanosilicate, aluminosilicate, metal-substituted, cerium-silicate, stannosilicate, titanosilicate, zirconosilicate, hafnosilicate, germanosilicate, and pure silica molecular sieves.

Germanosilicate molecular sieves are microporous material frameworks comprised of $Si^{4+}$ along with $Ge^{4+}$. These materials have neutral frameworks. A germanosilicate STW molecular sieve has an open framework structure sharing the oxygen atoms of [SiO$_4$] and [GeO$_4$] tetrahedral. In one embodiment, the syntheses are conducted in the presence of fluoride. The aqueous organic quaternary ammonium hydroxide is combined with a source of silica, e.g., tetraethylorthosilicate, along with a source of germanium, e.g. germanium(IV) ethoxide or germanium(IV) oxide. The resulting mixture is allowed to stir until complete hydrolysis of the alkoxides is accomplished. Excess water and alcohol are then allowed to evaporate, hydrofluoric acid is typically added, and the mixture is allowed to react under hydrothermal conditions until a crystalline product forms.

As used herein, the STW framework refers to the three letter code of molecular sieves consistent with the structural classification given by the Structure Commission of the International Zeolite Association. As indicated in the information provided by the Structure Commission of the International Zeolite Association incorporated herein by reference in its entirety STW framework includes ring sizes of 4, 5, 8 and 10 tetrahedral atoms.

Molecular sieves with the STW framework have a chiral framework with helical pores and have been synthesized as described in [8]. Using this material, enantiomeric restrictions at the molecular level could be possible.

One germanosilicate microporous material assigned framework code STW was first described in 2008 [9]. This material was designated as SU-32 and was a chiral framework with helical channels and synthesized as a racemic mixture. The material was synthesized using diisopropylamine (DIPA) as the organic structure directing agent (OSDA) with a typical synthesis composition of GeO$_2$:SiO$_2$:DIPA:H$_2$O:HF=1.0:0.8:79.3:27.7:3.5 and was synthesized by heating at 170° C. for 7 days under autogenous pressure.

Synthetic molecular sieves, particularly zeolites (e.g. aluminosilicates) are typically synthesized by mixing sources of alumina and silica in an aqueous media, often in the presence of a structure directing agent. The structure of the molecular sieve formed which includes STW framework is determined in part by solubility of the various sources, silica-to-alumina ratio, nature of the cation, synthesis conditions (temperature, pressure, mixing agitation), order of addition, type of OSDA, time of maintaining the reaction mixture and additional conditions identifiable by a skilled person. The aluminosilicate has catalytic activity due to the acid sites in the material.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985) [10].

Synthetic molecular sieves of pure tin(IV) oxide, titanium (IV) oxide, zirconium(IV) oxide, cerium (IV) oxide and hafnium(IV) oxide are typically synthesized by mixing sources of tin(IV) oxide, titanium(IV) oxide, zirconium(IV) oxide, cerium (IV) oxide and hafnium(IV) oxide, in the presence of an organic structure directing agent such as an amine or a quaternary ammonium.

As with pure silica molecular sieves, topologies of the molecular sieves of pure tin(IV) oxide, titanium(IV) oxide, zirconium(IV) oxide, cerium (IV) oxide and hafnium(IV) oxide depend on the ratios of various components in the reaction mixture, as well as the reaction conditions as will be understood by a skilled person.

In one embodiment, synthetic molecular sieves include silica with one additional tetravalent element oxide (i.e. MO$_2$, wherein M refers to a tetravalent element other than silicon) selected from the group consisting of tin(IV) oxide, titanium(IV) oxide, zirconium(IV) oxide, cerium (IV) oxide and hafnium(IV) oxide. The silica/MO$_2$ are typically synthesized by mixing silica with one of the sources of tin(IV) oxide, titanium(IV) oxide, zirconium(IV) oxide, cerium (IV) oxide and hafnium(IV) oxide, in the presence of an organic structure directing agent such as an amine or a quaternary ammonium. As with molecular sieve of pure silica, molecular sieve of SiO$_2$/MO$_2$ depends on the ratios of various components in the reaction mixture, as well as the reaction conditions as will be understood by a skilled person.

In some embodiments, a tetravalent element of pure tin(IV) oxide, titanium(IV) oxide, zirconium(IV) oxide, cerium (IV) oxide and hafnium(IV) oxide can be substituted with a divalent element, e.g., $Mg^{2+}$, $Zr^{2+}$, $Cr^{2+}$, $Mn^{2+}$, $Fe^{2+}$, $Co^{2+}$, $Ni^{2+}$, $Cu^{2+}$, $Zn^{2+}$ and other divalent metals.

The present disclosure is directed to methods of making molecular sieves having STW framework and molecular sieves obtained thereby. FIG. 1 shows an exemplary schematic representation of a STW framework.

The present disclosure is directed to methods of making molecular sieves of STW framework using an organic structure directing agent (OSDA), which is a hydrocarbon compound, typically further containing at least one nitrogen atom, capable of facilitating the formation of a molecular sieve of a particular structure.

In embodiments herein described where the organic structure directing agent (OSDA) is cationic, such as a quaternary ammonium, the counter anion can be an organic or an inorganic anion. Preferably, the inorganic anion can be selected from a group comprising hydroxide, fluoride, chloride, bromide, iodide, phosphate, sulfate, bisulfate, bisulfite, carbonate, bicarbonate, hexafluorophosphate, nitrate, oxyhalogen, such as chlorate, $ClO_3^-$ and perchlorate, $ClO_4^-$, and the organic anion is selected from a group comprising a C1-C4 aliphatic carboxylate, a C1-C4 aliphatic sulfate, a C1-C4 aliphatic sulfonate, a C1-C4 alkoxide and a C6-C10 aryl carboxylate, a C6-C10 aryl sulfate, a C6-C10 aryl sulfonate, a C6-C10 aryloxide. The organic anion can also be preferably selected from a C1-C4 cyclic, linear, branched, unbranched, saturated or unsaturated aliphatic group, or a C6-C10 substituted or non-substituted, aromatic, including heteroaromatic groups.

In some embodiments, a counter anion of the organic structure directing agents can be obtained by any one of the processes known to a person of skill in the art. For example in embodiments where the cationic OSDA has a iodide anion, such counter ion can be replaced with a hydroxide ion by ion exchange in water (see Examples 1-6).

According to embodiments of the present disclosure, the organic structure directing agent used includes the quaternary cation (1);

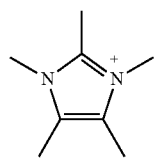

(1)

herein also indicated as 1,2,3,4,5-pentamethyl-M-imidazol-3-ium (1)

Figure 2:
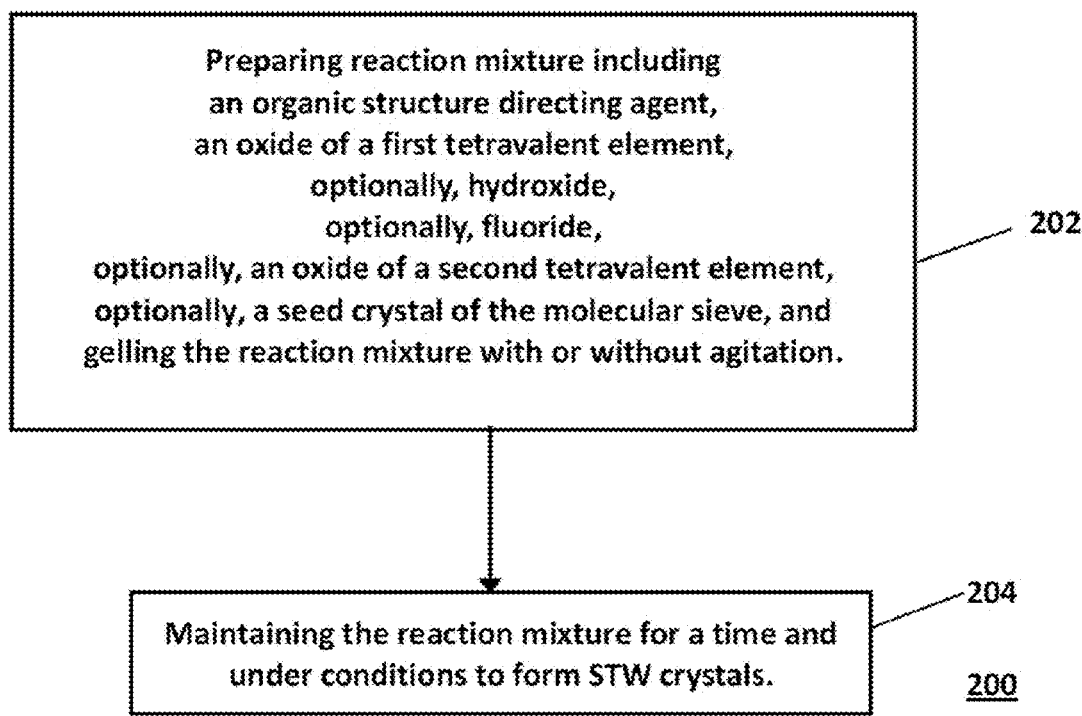
FIG. 2 provides a block diagram illustrating an exemplary method for preparing an as-synthesized molecular sieve having a tetravalent element in accordance with embodiments herein described.

In several embodiments, an as-synthesized molecular sieve with an STW framework containing an oxide of at least one tetravalent element described in the present disclosure can be prepared by using the procedure schematically illustrated in FIG. 2. In particular, FIG. 2 illustrates a method (200) which comprises preparing a reaction mixture including a first organic structure directing agent, e.g. a quaternary cation (1), an organic or an inorganic anion, a source of an oxide of a first tetravalent element, and optionally, a source of fluoride (202), and maintaining the reaction mixture for a time and under conditions to form crystals of the molecular sieve with STW framework (204).

In some embodiments, preparing a reaction mixture comprising (202) comprise combining the reagents to form a reaction mixture in a gel form, preferably a homogeneous gel form, with or without heating the reaction mixture at a temperature range of between about 20-100° C., with or without stirring or agitation thereof. In some embodiments wherein the preparing comprising heating the reaction mixture the heating can be performed for a time of from about 10 minutes to about 14 days. Preferably, preparing a reaction mixture to form a homogeneous gel can be performed at room temperature or at about 20° C., and in less than 8 hours with or without agitation.

In some embodiments, the pH of the reaction mixture depends on the choice of the anion for the OSDA 1, wherein when the anion is hydroxide the pH is higher than 7 and wherein when the anion is provided one or more counterions the pH is substantially neutral. For example, in exemplary embodiments, when fluoride is the counter ion and hydrogen fluoride is used to neutralize the hydroxide, a resulting mixture has a pH of about 7. In exemplary embodiments when hydroxide is the counter anion, a resulting mixture has a pH of about 12.5 to 14.

In embodiments of the method herein described, the reaction mixture can also include a source of a second oxide of a second tetravalent element. The first and second tetravalent elements can be elements from Groups 4-14 of the Periodic Table. For example, the first and second tetravalent elements can be independently any of silicon, germanium, titanium, tin, cerium, zirconium, or hafnium.

In one embodiment, the first tetravalent element is silicon and the second tetravalent element is germanium. The silicon-to-germanium molar ratio (Si/Ge) in the reaction mixture for germanosilicate STW can be between 1:1 and 20:1, preferably between 2:1 and 5:1, and most preferably about 2:1 to 3:2. In some of those embodiments, Si/Ge molecular sieves with STW framework herein described have a hydrothermal stability which increases with an increasing silicon content.

In some embodiments, sources of the first and second tetravalent elements can include sources of silicon, germanium, titanium, tin, cerium, hafnium, or zirconium. In some embodiments, sources of elements selected for the tetravalent elements can include oxides, hydroxides, acetates, oxalates, ammonium salts and sulfates of the element(s). Sources of silicon comprise fumed silica, precipitated silicates, silica hydrogel, silicic acid, colloidal silica, tetra-alkyl orthosilicates (e.g. tetraethyl orthosilicate in Example 7), and hydrated silica. Examples of silica sources useful for making high-silica forms of the molecular sieves of the disclosure include fumed silica (e.g. CAB-O-SIL M-5, Cabot Corporation), hydrated silica (e.g. HI-SIL 233, PPG Industries), silica tetra alkoxides, and mixtures thereof. In some embodiments source of silica can be provided by colloidal forms of silica where the solid content is 30-40 wt. % $SiO_2$, and these materials can be stabilized by small amounts of sodium or ammonium cations. Sources of germanium include germanium oxide and germanium ethoxide. The first tetravalent element and the second tetravalent element can be added to the reaction mixture from more than one source. Exemplary molecular sieves that can be synthesized with method (200) include pure silica STW and germanosilicate STW. In some embodiments, method (200) is expected to be useful in the synthesis of other Me(IV) silicates where Me is a +4 metal, such as titanosilicate STW, stannosilicate STW, cerium silica STW, hafnium silicate STW, and zirconium silicate STW. In some embodiments method (200) can be used to synthesize molecular sieves using oxides of three or more tetravalent elements, such as germanostannosilicate STW, including molecular sieves from oxides of four or five elements. Accordingly, in those embodiments preparing a reaction mixture (202) is performed with a source of a first tetravalent element, a second tetravalent element, a third tetravalent element and possibly additional tetravalent elements.

According to an embodiment of the STW molecular sieve synthesized using OSDA 1, optionally a fluoride, and an oxide of at least one tetravalent element, the reaction mixture can also include a second structure directing agent, preferably a second structure directing agent with the ability to direct the formation of STW molecular sieves identifiable by a skilled person upon reading of the present disclosure.

An example of the second agent with the ability to direct the formation of STW molecular sieves is OSDA 2. In some embodiments, the second structure directing agent can also include a tetramethylammonium ion, such as tetramethylammonium hydroxide (TMAOH) and tetramethylammonium bromide (TMABr) or OSDA 2. In some embodiments, addition of tetramethylammonium into the reaction mixture can result in an acceleration of the formation of molecular sieves with respect to the timing of formation of the molecular sieve with a reaction mixture having the same reagents without the tetramethylammonium. In some embodiments, the ratio between OSDA and the tetramethylammonium ion can range between 1:2 to 100:1, preferably between 10:1 and 50:1. In some embodiments, TMAOH can be omitted from the reaction mixture in method (200).

In some embodiments, the first tetravalent element is silicon and the second tetravalent element is germanium, wherein the Si/Ge ratio of the reaction mixture can be between 1:1 and 20:1, preferably between 2:1 and 5:1, and most preferably about 2:1 to 3:2. In some embodiments, of Si/Ge ratio, where Si/Ge becomes infinite, the reaction mixture can be considered a pure silica mixture.

According to an embodiment of the STW molecular sieve synthesized using a quaternary SDA, fluoride, and an oxide of at least one tetravalent element, the reaction mixture can also include anions such as hydroxide, fluoride, chloride, bromide, iodide, acetate, sulfate, tetrafluoroborate and carboxylate. An exemplary anion for the reaction mixture is fluoride, which can be available as an aqueous salt or in the form of hydrogen fluoride (HF). An additional exemplary anion for the reaction mixture is hydroxide which in some embodiments can be added to the reaction mixture in form of TMAOH. In one embodiment, the reaction mixture contains hydroxide and fluoride ions in ratios between 1OH$^-$: 4F$^-$ to 4OH—:1F, such as between 3OH$^-$:4F$^-$ to 4OH—: 3F$^-$, and preferably around 1OH$^-$:1F$^-$. In one preferred embodiment, OSDA hydroxide is neutralized with a an equal molar amount of hydrogen fluoride such that the hydroxide is substantially replaced with fluoride ion as the counter anion in the solution as shown in examples 9-11. The term "substantially replaced" as used herein with reference to ion replacement refers to embodiments in which at least 99% of a first anion is replaced by a second anion and includes hydroxide neutralized by hydrogen fluoride.

In some embodiments, preparing the reaction mixture (202) for method (200) includes combining a first OSDA, e.g., in the bromide or hydroxide form, with a source of an oxide of a first tetravalent element, such as a source of silica, e.g., tetraethylorthosilicate. Optionally, the combining can include adding a second organic structure directing agent to the can be added to the reaction mixture. The second structure directing agent can include for example OSDA 2, or other STW-structure directing agents.

In some embodiments, the reaction mixture of method (200) can include seed crystal and preparing the reaction mixture (202) can include seeding the reaction mixture with the seed crystals, possibly seed crystals having STW framework. In some embodiments, seed crystals can be added in order to accelerate the formation of the molecular sieves. For example, seed crystals can be at or around 0.01 µm to 10 µm in diameter, and preferably at or around 0.05 µm to 2 µm in diameter to accelerate the formation of the molecular sieve. Smaller seed crystals can result in faster molecular sieve formation. In some embodiments, seed crystals can be introduced in the reaction mixture in form of free crystals in suspension. In some embodiments, seed crystals can be introduced in the reaction mixture incorporated onto solid supports (e.g. membranes).

In some embodiments, the preparing (202) of the reaction mixture can include sealing the mixture in a container and/or stirring the mixture for a time period sufficient to substantially complete the hydrolysis of alkoxides in the reaction mixture, preferably for at least 12 hours, and more preferably for around 12-14 hours. The term substantially complete with reference to a reaction indicate a time sufficient to have a detectable product of the reaction in the reaction mixture.

In some embodiments the preparing (202) can comprise evaporating water and/or other volatile byproducts, such as ethanol, isopropanol, and other alcohols, e.g. using a stream or air, possibly in an evaporation step. Some water can be retained after the evaporating. In some embodiments, the preparing (202) can comprise fluorinating the reaction mixture by adding fluoride to the reaction mixture, e.g. in the form of aqueous hydrogen fluoride (or hydrofluoric acid), sodium fluoride, or other fluoride salts.

In particular in embodiments of method (200) herein described the first tetravalent element can be added in a particular H$_2$O/first tetravalent element ratio.

In some embodiments of the method (200), wherein the tetravalent element is silica the molar ratio of water to SiO$_2$ in the reaction mixture is 20 or less, preferably 2 to 14, most preferably between 4 to 7. In some embodiments of the method (200), the molar ratio of tetravalent element to the OSDA is between about 4:1 to 1:2, preferably between about 3:1 to 1:1, most preferably about 2:1.

In some embodiments the preparing (202) can comprise keeping and/or stirring the reaction mixture at a temperature between about 20° C. and about 100° C. for a time range from about 10 min to about 2 weeks to form a homogeneous gel mixture, in a gelling step. Preferably, the preparing (202) can further comprise keeping and/or stirring the reaction mixture at a temperature about 20° C.

In some embodiments of the method (200), the reaction mixture can be maintained for a time and under conditions to form crystals of the molecular sieve with STW framework (204). In particular the maintaining can be performed from about 1 to about 70 days, preferably from about 3 to about 23 days and in particular, from about 5 to about 7 days.

In particular the maintaining (204) can include heating the reaction mixture at a temperature between about 100° C. and about 200° C.; between about 140° C. and about 180° C.; between about 160° C. and about 175° C.

In some embodiments, methods and system herein describe and related structure directing agent can be used to prepare an as-synthesized molecular sieve with a STW framework containing at least one oxide of a tetravalent element further comprising a small amount of at least one oxide of a trivalent element, in a tetravalent element:trivalent element ratio of at least 100:1.

Figure 3:
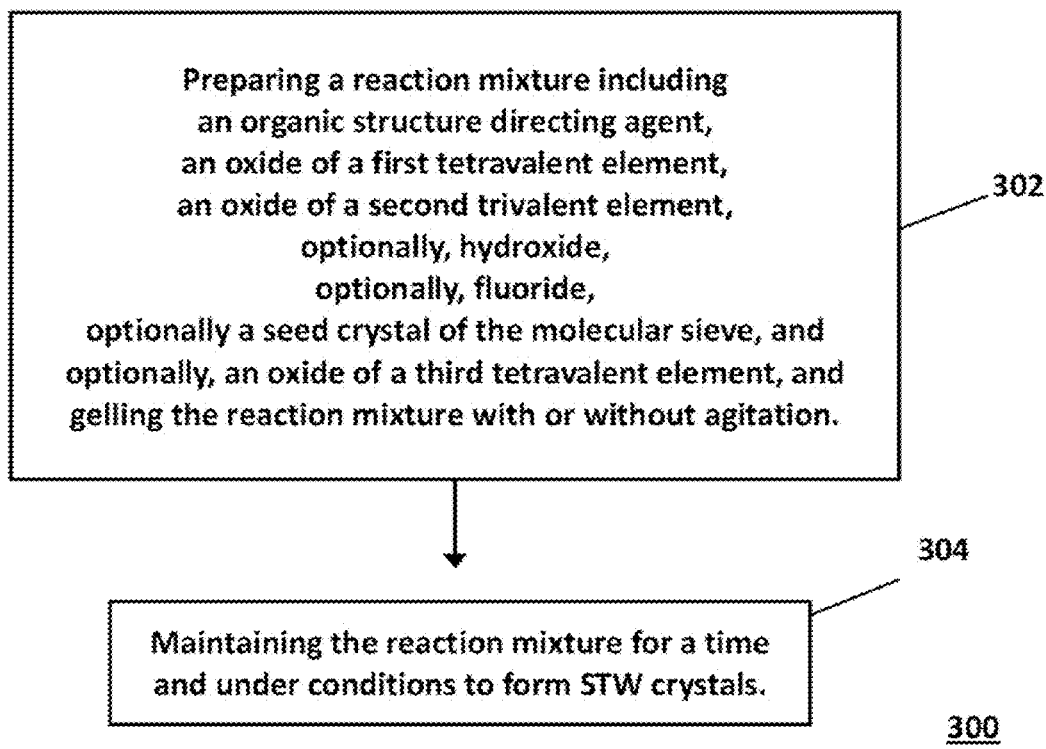
FIG. 3 provides a block diagram illustrating an exemplary method for preparing an as-synthesized molecular sieve having a first tetravalent element and a second trivalent element in accordance with embodiments herein described.

In particular, FIG. 3 illustrates a method (300) which comprises preparing a reaction mixture (302) including a first structure directing agent comprising a quaternary cation (1),

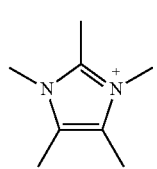

1 a source of a first oxide selected from a group consisting of oxides of first tetravalent elements; and a source of a second oxide selected from a group consisting of oxides of a trivalent element (e.g. aluminum (III)), alone or together with oxides of a second tetravalent element, (e.g., germanium(IV) ethoxide, germanium(IV) oxide or other germanium (IV) alkoxides with a molar ratio tetravalent element to trivalent element is 100:1 and greater, and maintaining the reaction mixture for a time and under condition to form crystals of the molecular sieve with STW framework (304).

In some embodiments, the oxides of first and second tetravalent elements can be independently oxides of elements from Groups 4-14 of the Periodic Table. For example, the first and second tetravalent elements can be independently any of silicon, germanium, titanium, tin, hafnium, cerium, or zirconium. In one embodiment, the tetravalent element is silicon and the oxide is silicon dioxide.

In method (300) sources of the first and second tetravalent elements can include oxides, hydroxides, acetates, oxalates, ammonium salts and sulfates of the element(s). Sources of silicon include fumed silica, precipitated silicates, silica hydrogel, silicic acid, colloidal silica, tetra-alkyl orthosilicates (e.g. tetraethyl orthosilicate), and silica hydroxides. Examples of silica sources useful for making high-silica forms of the molecular sieves of the disclosure include fumed silica (e.g. CAB-O-SIL M-5, Cabot Corporation), hydrated silica (e.g. HI-SIL 233, PPG Industries), silica tetra alkoxides and mixtures thereof. Also useful are colloidal forms of silica where the solid content is 30-40 wt. % $SiO_2$, and these materials can be stabilized by small amounts of sodium or ammonium cations. Sources of germanium include germanium oxide and germanium ethoxide. In some embodiments each of the first, second or other tetravalent elements is provided from more than one source.

In one embodiment, the first tetravalent element is silicon and the second tetravalent element is germanium. In some of those embodiments, the silicon-to-germanium molar ratio (Si/Ge) of the resulting germanosilicate STW framework can be between 1:1 and 20:1, preferably between 2:1 and 5:1, and most preferably about 2:1 to 3:2.

In embodiments of the method (300) the trivalent element can be selected from a group consisting of elements from Groups 3-13 of the Periodic Table. More specifically, the trivalent element can be a metal with the +3 oxidation state, such as of gallium, aluminum, iron, cobalt, rhodium, lanthanum, praseodymium, gadolinium, boron, titanium, vanadium, and chromium. The trivalent element in the +3 oxidation state can also be indium, thallium, scandium, or yttrium, wherein the molar ratio of the first tetravalent element to the second trivalent element is 100:1 and greater. Oxides of trivalent elements can be introduced into the reaction mixture in the form of hydroxides, acetates, oxalates, ammonium salts and sulfates of the trivalent elements. Typical sources of aluminum oxide include aluminates, alumina, and aluminum compounds such as Al(isopropoxide)$_3$, AlCl$_3$, Al(NO$_3$)$_3$, Al$_2$(SO$_4$)$_3$, Al(OH)$_3$, kaolin clays, and other zeolites. An example of the source of aluminum oxide is LZ-210 zeolite (a type of Y zeolite). Boron, gallium, and iron can be added in forms corresponding to their aluminum and silicon counterparts. In some embodiments, the trivalent elements can be provided from the reaction mixture from more than one source.

In some embodiment, the reaction mixture can include a source of a third oxide of a third tetravalent element. The third tetravalent element is selected from Groups 4-14 of the Periodic Table. In some embodiments, the third tetravalent element is selected from the group consisting of silicon, germanium, titanium, tin, zirconium, cerium and hafnium.

In some embodiments of the method (300), the reaction mixture can be maintained for a time and under conditions to form crystals of the molecular sieve with STW framework (304). In particular the maintaining can be performed from 3 to 70 days, preferably from 3 to 23 days and in particular, from 5 to 7 days.

For each embodiment described herein, the molecular sieve reaction mixture can be supplied by more than one source of a given reagent. For example in some embodiments, silica can be supplied to the reaction by both a fumed silica source and from another molecular sieve added to provide an Al source. The molecular sieve provided can also provide some silica. Also, in one embodiment, two or more reaction components can be provided by one source, such as, for example, where tetramethylammonium hydroxide is used to provide the second structure directing agent and the hydroxide for making germanium silicate STW. Crystal size, morphology and crystallization time of the molecular sieve described herein can vary with the nature of the reaction mixture and the crystallization conditions.

In embodiments where the molecular sieve formed is an intermediate material, the process of the present disclosure can further include synthesizing a target molecular sieve by post-synthesis techniques, such as acid leaching. Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

In some embodiments by varying the starting inorganic compounds, a variety of molecular sieves can be obtained using the method of the present disclosure. Each of the molecular sieves is defined in accordance with the rules approved by the Structure Commission of the International Zeolite Association. Complete information on the structure and properties of STW can be found at the www page iza-structure.org/databases [11], the entire content of which is incorporated herein by reference.

In some embodiments, after a reaction mixture has been prepared as described herein above, the reaction mixture can be maintained under crystallization conditions sufficient to form the molecular sieve. Such conditions are generally known. (See, Harry Robson, *Verified Syntheses of Zeolitic Materials*, $2^{nd}$ revised edition, Elsevier, Amsterdam (2001)) [12]. For example, the reaction mixture can be maintained at an elevated temperature until the molecular sieve is formed over a period of a few days to several weeks. The hydrothermal crystallization is usually conducted under autogenous pressure, ranging from 50-200 PSI (0.34 MPa to 1.38 MPa), and usually in an autoclave so that the reaction mixture is subject to autogenous pressure, at a temperature at a temperature between about 100° C. and about 200° C.; between about 140° C. and about 180° C.; between about 160° C. and about 175° C.

In some embodiments the reaction mixture can be subjected to mild stirring or agitation during crystallization. It will be understood by a person skilled in the art that the molecular sieves described herein can contain impurities, such as amorphous materials, unit cells having framework topologies which do not coincide with the molecular sieve, and/or other impurities (e.g., organic hydrocarbons). During hydrothermal crystallization, the molecular sieve crystals can be allowed to nucleate spontaneously from the reaction mixture.

In some embodiments, molecular sieves with the STW framework can be prepared as a pure-silica material, or an aluminosilicate with a composition including Si/Al=100 and greater, a germanosilicate material, with oxidation state +2 metals substituted in the framework, e.g., $Mg^{2+}$, $Zr^{2+}$, $Cr^{2+}$, $Mn^{2+}$, $Fe^{2+}$, $Co^{2+}$, $Ni^{2+}$, $Cu^{2+}$, and other +2 oxidation state metals. Preferably, OSDA 1 with hydroxide counter ion is used to direct the STW framework formation.

In some embodiments, organic structure directing agent OSDA 1 can be combined with one or more other OSDAs to facilitate the formation of a particular molecular sieve, e.g. of STW framework. In one embodiment, OSDA 1 and OSDA 2 are combined in composition mixture to prepare an as-synthesized STW molecular sieve. The ratio of OSDA 1 to OSDA 2 is within the ranges selected from the group consisting of from about 1:10 to about 10:1, from about 1:5 to about 5:1 and from about 1:2 to about 2:1. Any combinations among OSDAs 1 to 6 are feasible and can be practiced by a person of ordinary skill in the art based on the present disclosure. In some embodiments, the composition mixture includes OSDA 1 in combination with a second OSDA selected from the group consisting of OSDAs 3-6, wherein the ratio of OSDA 1 to the second OSDA is within the ranges selected from the group consisting of from about 1:10 to about 10:1, from about 1:5 to about 5:1 and from about 1:2 to about 2:1.

In embodiments of methods and systems herein described, the use of crystals of the molecular sieve as seed material can result in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 0.01% and 10% of the mass of the total amount of oxide in the reaction mixture. The total amount of oxide refers to the total mass of oxides in the reaction mixture gel prior to heating, including but not limited to silica, alumina, germanium(IV) oxide, and other metal oxides. Once the molecular sieve has formed, the solid product is separated from the reaction mixture by standard mechanical separation techniques such as filtration. The crystals are water-washed and then dried to obtain the as-synthesized molecular sieve crystals. The drying can be performed at atmospheric pressure or under vacuum, and possibly at an elevated temperature, most preferably around 100° C.

In several embodiments the molecular sieve obtained with methods herein described can be used as-synthesized, or can be thermally treated (calcined). The term "as-synthesized" refers to the molecular sieve in its form after crystallization, prior to removal of the structure directing agent. The structure directing agent can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the structure directing agent from the molecular sieve. The structure directing agent can also be removed by photolysis techniques (e.g. exposing the structure directing agent-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005 [13].

In some embodiments, the molecular sieve obtained with methods herein described can be calcined in steam, air or inert gas at temperatures ranging from about 200° C. to about 800° C. for periods of time ranging from 1 to 48 hours, or more.

In one embodiment, the calcined material is the pure silica molecular sieve without any remaining organic. It is calcined by heating in air to 580° C. and holding at that temperature for at least 6 hours to assure complete combustion and removal of the organic. Since it is calcined the pores are open, i.e. no longer filled with organic.

Structure directing agents can also be removed using oxidation processes, such as the oxidization of organic compounds using ozone. Ozone can also be used to remove organic structure directing agents at either room temperature or elevated temperatures, such as between about 75° C. and about 250° C., preferably at temperatures between about 125° C. and about 175° C., such as at 150° C., which can prevent severe degradation of the molecular sieve framework. Usually, it is also desirable to remove the extra-framework cations (e.g. $Na^+$) by ion-exchange or other known method and replace it with ammonium, or any desired metal-ion.

In embodiments, in which the molecular sieve formed is an intermediate material, the target molecular sieve can be achieved using post-synthesis techniques to allow for the synthesis of a target material having a higher Si:Al or other analogous ratios from an intermediate material by acid leaching or other similar dealumination methods.

Molecular sieves synthesized by the processes of the present disclosure can be characterized by their XRD pattern. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al or other mole ratios from sample to sample. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ, where θ is the Bragg angle, were read from the relative intensities of the peaks (adjusting for background), and d, the interplanar spacing in Angstroms corresponding to the recorded lines, can be calculated.

In some embodiments, the molecular sieve catalyst of the present disclosure can optionally be combined with one or more catalyst supports, active base metals, other molecular sieves, promoters, and mixtures thereof. Examples of such materials and the manner in which they can be used are disclosed in U.S. Pat. No. 4,910,006, issued May 20, 1990 to Zones et al. [14], and U.S. Pat. No. 5,316,753, issued May 31, 1994 to Nakagawa [15].

In several embodiments, metals can also be introduced into molecular sieves herein described by replacing some of the cations in the molecular sieve with metal cations via standard ion exchange techniques known in the art. Typical replacing cations can include metal cations, e.g., rare earth, Group IA, Group IIA and Group VIII metals, as well as their mixtures. Examples of the replacing metallic cations include cations of metals such as rare earth, manganese, calcium, magnesium, zinc, cadmium, platinum, palladium, nickel, cobalt, titanium, aluminum, tin and iron.

In some embodiments, the hydrogen, ammonium, and metal components can be ion-exchanged into the molecular sieves of the disclosure. The molecular sieves of the disclosure can also be impregnated with the metals, or the metals can be physically and intimately admixed with the molecular sieves of the disclosure using standard methods known to the art. Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this approach results in a more effective ion exchange. Representative ion exchange techniques are known in the art.

In some embodiments, monovalent element (e.g. Group I alkali elements) and divalent elements in +2 oxidation state or ions of can exchange cations associated with the molecular sieve after the molecular sieve framework is formed. In some embodiments, divalent elements can be one or more transition metals such as zinc, iron, cobalt, copper, iron, manganese, and nickel or main group alkaline earth metal ion, such as magnesium and calcium. In some embodiments, the monovalent elements are alkali elements selected from one or more of Li, Na, K, Rb and Cs. In some embodiments the percentage of substitution by ion exchanged is typically under 5%, preferably under 1%.

In some embodiments, one or more of the monovalent element and/or divalent elements in +2 oxidation state used in the exchange can have an organic or inorganic counter ion. The inorganic counter ion can be one or more hydroxide, fluoride, chloride, bromide, iodide, phosphate, sulfate, bisulfate, bisulfite, carbonate, bicarbonate, hexafluorophosphate, nitrate, oxyhalogen, such as chlorate, $ClO_3^-$ and perchlorate, $ClO_4^-$. The organic anion can be one or more of a C1-C4 aliphatic carboxylate, a C1-C4 aliphatic sulfate, a C1-C4 aliphatic sulfonate, a C1-C4 alkoxide and a C6-C10 aryl carboxylate, a C6-C10 aryl sulfate, a C6-C10 aryl sulfonate, a C6-C10 aryloxide.

In some embodiments, following contact with the salt solution of the desired replacing cation, the molecular sieve is typically washed with water and dried at temperatures ranging from about 65° C. to about 200° C. After washing, the molecular sieve can be calcined in air or inert gas as described above, to produce a catalytically active product especially useful in hydrocarbon conversion processes. Regardless of the cations present in the as-synthesized form of the molecular sieves of the disclosure, the spatial arrangement of the atoms which form the basic crystal lattice of the molecular sieve remains essentially unchanged.

The molecular sieves made with the methods of the present disclosure can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieves made with the methods of the present disclosure can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al. [14], and U.S. Pat. No. 5,316,753, issued May 31, 1994 to Nakagawa [16], both of which are incorporated by reference herein in their entirety.

The molecular sieves made with the methods of the present disclosure are useful in catalysts for a variety of hydrocarbon conversion reactions such as hydrocracking, dewaxing, isomerization and the like. The molecular sieves made from the process of the present disclosure can be also useful as adsorbents and as low-dielectric K materials. Exemplary uses of the molecular sieve having low dielectric K potential are described in U.S. Pat. No. 7,138,099 [17] incorporated herein by reference in its entirety.

EXAMPLES

The molecular sieves, structure directing agents and related methods and system herein described are further illustrated in the following examples, which are provided by way of illustration and are not intended to be limiting.

In particular, the following examples illustrate exemplary synthesis and characterization of molecular sieves performed with OSDAs according to the present disclosure a person skilled in the art will appreciate the applicability of the features described in detail for the exemplified synthesis process and related molecular sieves to different reaction conditions and reagents in accordance with the present disclosure.

The following experimental procedures and characterization data were used for all compounds and their precursors exemplified herein.

Detailed synthesis and characterization details for each of the experimentally tested OSDAs are disclosed herein. In some embodiments, organic compounds were quaternized with iodomethane or iodoethane, purified using recrystallization, exchanged to hydroxide form using hydroxide exchange gel and titrated.

Unless otherwise noted all reagents were purchased from Sigma-Aldrich and were used as received. Hydroxide ion exchanges were performed using Supelco Dowex Monosphere 550A UPW hydroxide exchange resin with an exchange capacity of 1.1 meq/mL. Titrations were performed using a Mettler-Toledo DL22 autotitrator using 0.01 M HCl as the titrant. All liquid NMR spectra were recorded with a 400 MHz Varian Spectrometer or with a 500 MHz Spectrometer.

The $^{13}C$ CP-MAS NMR was recorded using a Bruker Avance 200 MHz spectrometer with a 7 mm rotor at a spinning rate of 4 kHz and were conducted in a 4.7 T magnetic field corresponding to Larmor frequencies of 200 MHz and 50.29 MHz for $^1H$ and $^{13}C$ respectively. The $^{13}C$ spectra are referenced to adamantane as a secondary external standard relative to tetramethylsilane.

All TGA/DSC measurements were performed on Netzsch STA 449C Jupiter. Unless otherwise noted, samples were heated in air to 900° C. at a rate of 1 K/min.

All argon isotherms were performed at 87.45 K using a Quantachrome Autosorb iQ and were conducted using a quasi-equilibrium, volumetric technique [18].

A general synthesis procedure for the microporous materials can be found below. In all situations where a rotating oven was used the samples were spun at 63 rpm.

Products were prepared by washing with water and acetone consecutively and collecting the products via centrifugation and then drying at 105° C. Products were ground to a fine powder before XRD characterization. All powder x-ray diffraction characterization was conducted on a Rigaku MiniFlex II with Cu K$_\alpha$ radiation. Diffraction patterns were then compared to known spectra to determine products.

Example 1

Synthesis OSDA 1 Hydroxide 1,2,3,4,5-pentamethyl-1H-imidazol-3-ium (1) hydroxide was synthesized as shown in Scheme 1. 1,2,4,5-tetramethylimidazole (TCl Chemicals) was dissolved in methanol and then cooled in an ice bath. A three-fold molar excess of iodomethane was then slowly added (Caution: Highly exothermic reaction!) and the mixture was stirred at 0° C. and then slowly warmed to room temperature and stirred for one day. The solvent and excess iodomethane were then removed using rotary evaporation and the product was recrystallized from acetone. The structure was verified using $^1$H NMR (D$_2$O) and the intermediate OSDA 1 iodide was converted from the iodide to the hydroxide product form using hydroxide exchange resin in water. $^1$H-NMR (500 MHz, D$_2$O, OSDA 1 iodide): δ 3.60 (s, 6H), 2.54 (s, 3H), 2.20 (s, 6H). $^{13}$C-NMR (125 MHz, D$_2$O): δ 7.99, 9.76, 31.58, 125.42, 142.21.

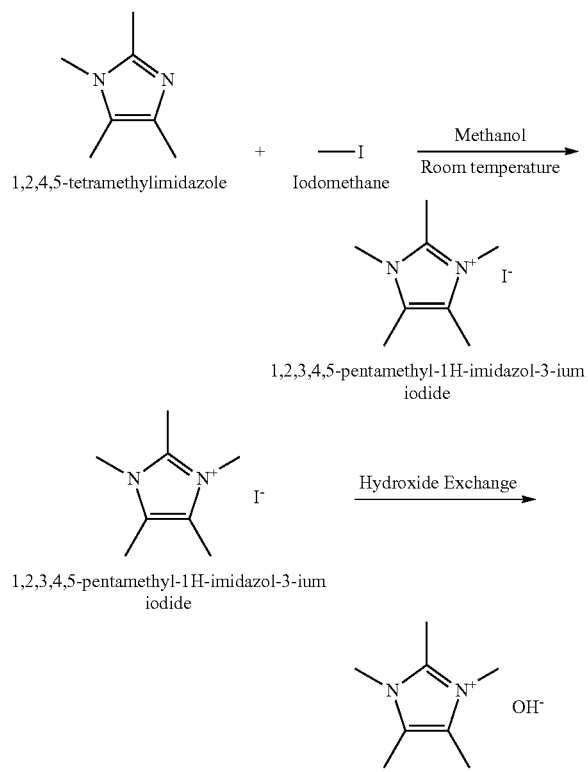

Example 2

Synthesis of OSDA 2 Hydroxide

OSDA 2 was synthesized by the method reported by Camblor et al. [19] and herein summarized in Scheme 2

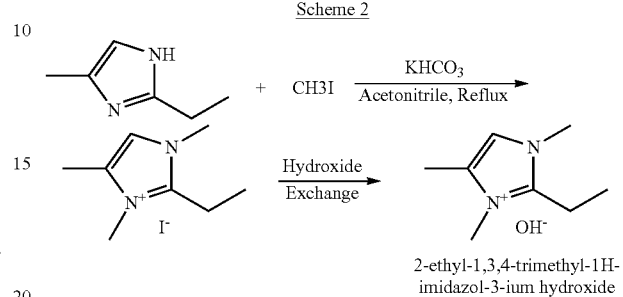

Example 3

Synthesis of OSDA 3 Hydroxide

OSDA 3 was synthesized by exhaustive methylation of 2-isopropylimidazole (TCl Chemicals) in acetonitrile at reflux in the presence of potassium bicarbonate. The solvent was removed using rotary evaporation and the product was separated using chloroform.

The product was recrystallized from acetone. The structure was verified using $^1$H NMR (D$_2$O) and the intermediate OSDA 3 iodide was converted from the iodide to the hydroxide product form using hydroxide exchange resin in water. $^1$H-NMR (500 MHz, D$_2$O, OSDA 3 iodide): δ 1.44 (d, 6H), 3.60 (7, 1H), 3.84 (s, 6H), 7.23 (s, 2H). $^{13}$C-NMR (125 MHz, D$_2$O): δ 17.55, 24.79, 35.68, 122.65, 149.69.

Example 4

Synthesis of OSDA 4 Hydroxide

OSDA 4 was synthesized exhaustive methylation of 2-ethylimidazole (TCl Chemicals) in acetonitrile at reflux in the presence of potassium bicarbonate. The solvent was removed using rotary evaporation and the product was separated using chloroform.

The intermediate was recrystallized from acetone. The intermediate OSDA 4 iodide was converted from the iodide to the hydroxide product form using hydroxide exchange resin in water. $^1$H-NMR (500 MHz, D$_2$O, OSDA 4 iodide): δ 1.28 (t, 3H), 3.03 (q, 2H), 3.83 (s, 6H), 7.32 (s, 2H). $^{13}$C-NMR (125 MHz, D$_2$O): δ 9.92, 16.59, 34.71, 122.07, 148.16.

Example 5

Synthesis of OSDA 5 Hydroxide

OSDA 5 was synthesized from 2-phenylimidazole (TCl Chemicals) and an excess of ethyl iodide in chloroform at reflux in the presence of potassium bicarbonate. The solvent was removed using rotary evaporation and the intermediate was separated using chloroform.

The product was recrystallized from acetone. The intermediate OSDA 5 iodide was converted from the iodide to the hydroxide product form using hydroxide exchange resin in water. $^1$H-NMR (500 MHz, D$_2$O, OSDA 5 iodide): δ 1.35 (t, 6H), 4.03 (q, 4H), 7.63 (s, 2H), 7.64-7.77 (phenyl aromatic protons). $^{13}$C-NMR (125 MHz, D$_2$O): δ 14.73, 43.94, 121.39, 129.73, 130.35, 132.62, 144.05.

Example 6

Synthesis of OSDA 6 Hydroxide

OSDA 6 was synthesized in two steps. First a stoichiometric amount of methyl iodide was added to 2-isopropylimidazole in acetonitrile along with 2 molar equivalents of KOH then stirred for 4 hours at room temperature. The solvent was removed using rotary evaporation and the product was extracted with chloroform 3 times, then washed with water, and dried with magnesium sulfate.

An excess of ethyl iodide was added and refluxed overnight. The solvent was removed using rotary evaporation, and the intermediate was recrystallized from acetone.

The intermediate OSDA 6 iodide was converted from the iodide to the hydroxide product form using hydroxide exchange resin in water. $^1$H-NMR (500 MHz, D$_2$O, OSDA 6 iodide): δ 1.43-1.46 (m, 9H), 3.62 (M, 1H), 3.86 (s, 3H), 4.22 (q, 2H), 7.26 (d, 1H), 7.32 (d, 1H). $^{13}$C-NMR (125 MHz, D$_2$O): δ 20.28, 23.11, 29.85, 40.97, 125.75, 128.49, 154.47.

Example 7

Synthesis of SiO$_2$ Crystalline Molecular Sieves

A general synthesis procedure was as follows. Tetraethylorthosilicate (TEOS) was added to 1,2,3,4,5-pentamethyl-1H-imidazol-3-ium (1) in its hydroxide form in a container. The container was closed and stirred for at least 12 hours to allow for complete hydrolysis. The lid was then removed and the ethanol and appropriate amount of water were allowed to evaporate under a stream of air. It was assumed that all the ethanol evaporated along with the water, which is supported by the work of Camblor et al. [20].

Once the appropriate mass was reached the material was transferred to a Teflon Parr Reactor, ROH (e.g. 1,2,3,4,5-pentamethyl-1H-imidazol-3-ium (1) hydroxide) and aqueous HF was added sequentially and the mixture. (i) as represented by the following molar ratio:

1SiO$_2$:0.5ROH:0.5HF:4H$_2$O    (i)

wherein ROH is one of the OSDA hydroxide synthesized according to Examples 1 to 6, was stirred by hand until a homogenous gel was obtained. The autoclave was sealed and placed in a rotating oven at temperatures ranging from 140 to 175° C. Aliquots of the material were taken periodically by first quenching the reactor in water and then removing enough material for powder x-ray diffraction (PXRD). A pure silica STW molecular sieve was obtained with the OSDA 2 from Rojas and Camblor. After 33 days at 175° C., the pure silica reaction mixtures gave solids that also had PXRDs consistent with pure silica STW.

Figures 4A, 4B:
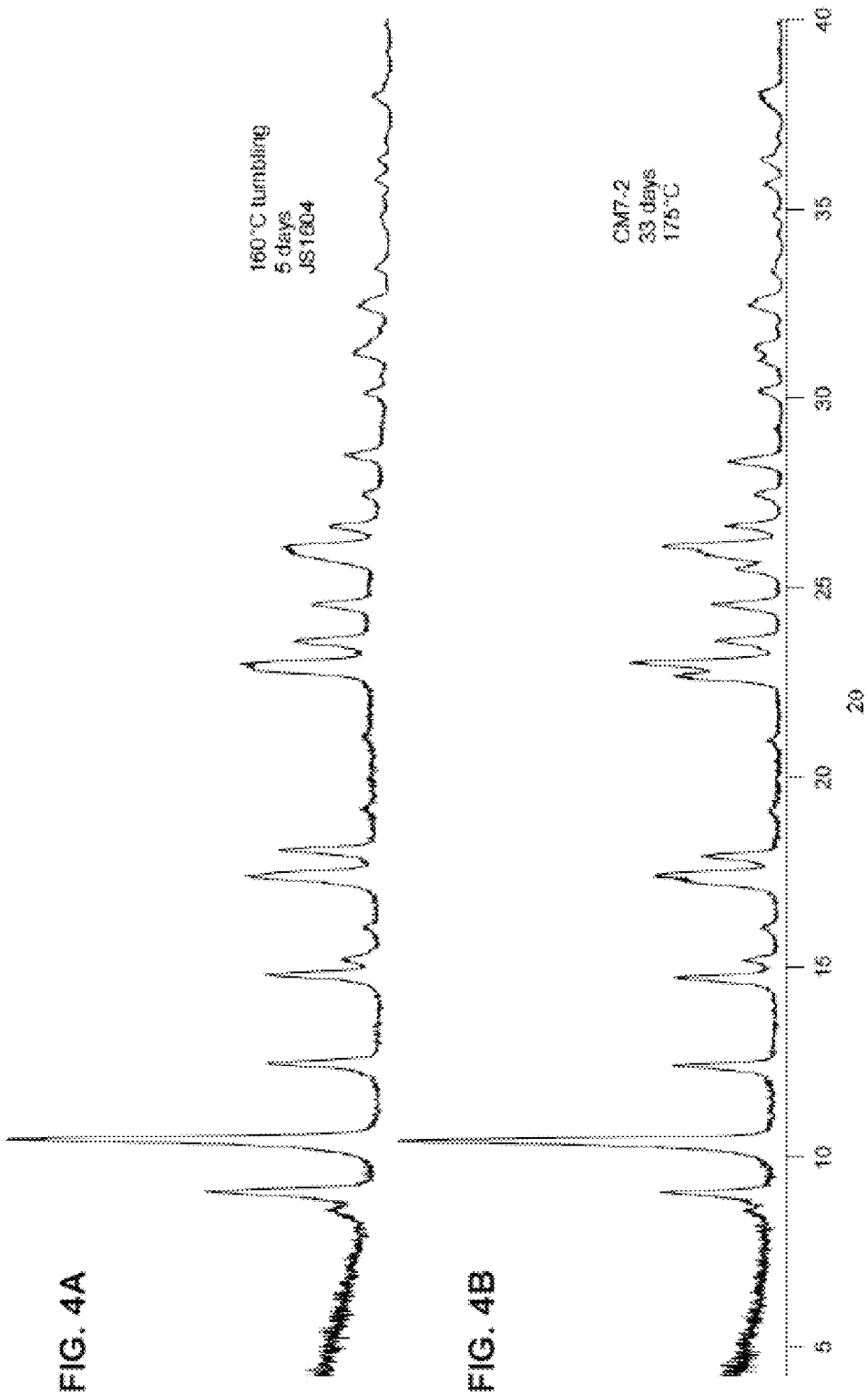
FIGS. 4A and 4B show powder X-ray diffraction patterns of a pure silica STW produced with different SDAs. In particular in FIG. 4A the powder X-ray diffraction patterns of a pure silica STW produced with 1,2,3,4,5-pentamethyl-1H-imidazol-3-ium (1) is shown.

FIG. 4 shows a PXDR of the as synthesized molecular sieves obtained with OSDA (1) (FIG. 4A,) in comparison to HPM-1 (i.e. pure silica STW molecular sieve) produced using the OSDA (2) (FIG. 4B).

Example 8

Synthesis of STW SiO2 Crystalline Molecular Sieves with OSDA 1

A pure silica STW molecular sieve was obtained with the 1,2,3,4,5-pentamethyl-1H-imidazol-3-ium (1) hydroxide after five days at either 160 or 175° C., the pure silica reaction mixtures gave solids that also had PXRDs consistent with pure silica STW.

Powder X-ray Diffraction Patterns (PXRDs) of the synthesized materials were obtained and are shown in FIG. 5A (160° C. temperature) and FIG. 5B (175° C. temperature).

Example 9

Synthesis of Si/Ge Crystalline Molecular Sieves

A general synthesis procedure was performed as described in Example 7 using the synthesized 1,2,3,4,5-pentamethyl-1H-imidazol-3-ium hydroxide (1) in the reaction mixture:

0.67SiO$_2$:0.33GeO$_2$:0.5ROH:0.5HF:7H$_2$O    (ii)

wherein ROH is one of the OSDA synthesized according to Examples 1 to 6.

Synthesis was performed at 160° C. at autogeneous pressure in an oven where the reaction vessels were tumbled for three to five days.

After three days of heating the germanosilicate reaction mixture at 160° C., a product that gave a powder X-ray diffraction pattern (PXRD) consistent with germanosilicate STW was recovered.

Figure 6A:
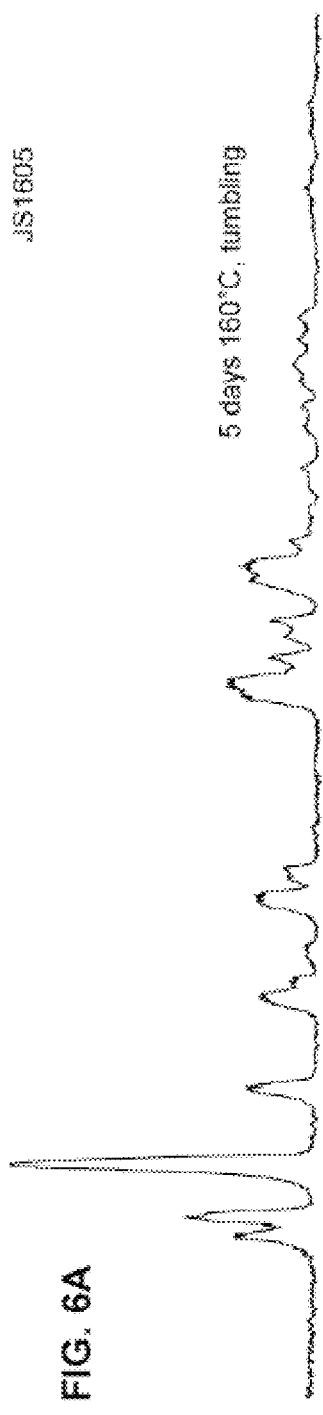
FIGS. 6A and 6B show powder X-ray diffraction patterns of a germanosilicate STW produced using 1,2,3,4,5-pentamethyl-1H-imidazol-3-ium (1) at 160° C. for different time periods. In particular in FIG. 6A the powder X-ray diffraction patterns of a germanosilicate STW produced at 160° C. for 5 days is shown.
Figure 6B:
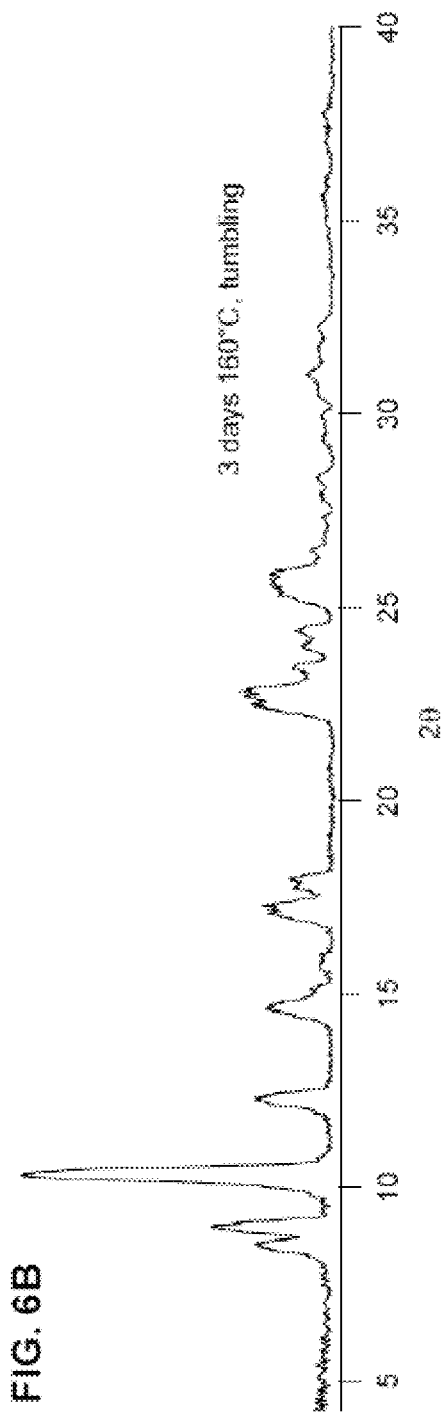

PXRDs of the synthesized materials using germanium ethoxide with Si/Ge=2 in the mixture are shown in FIG. 6.

Examples 10

Synthesis of Crystalline Molecular Sieves Using Different SiO$_2$/H$_2$O Ratios

Pure silica syntheses were performed using the procedure exemplified in Example 7A-C with different SiO$_2$/H$_2$O ratios. In particular. the final molar ratios of the gel reaction mixture were:

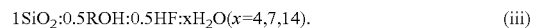
1SiO$_2$:0.5ROH:0.5HF:xH$_2$O(x=4,7,14).    (iii)

wherein ROH is one of the OSDA synthesized according to Examples 1 to 6.

Each composition was run at 140, 160 and 175° C. and aliquots were periodically taken by first quenching the reactor in water and then removing enough material for powder X-ray diffraction (PXRD).

Full reaction results are summarized in Table 8 for each OSDA. Reference was made to the PXRD patterns for various molecular sieves exemplified in FIG. 8 to identify the molecular sieves obtained with as a result of the various experimental procedures.

Example 11

Synthesis of al/Si STW Crystalline Molecular Sieves

In a typical preparation 16.3 mmol of aqueous 1,2,3,4,5-pentamethyl-1H-imidazol-3-ium hydroxide (1) (typically as a solution that is approximately 0.1-2 mmol of organic per gram of solution) was mixed with 2 grams of Tosoh 390 (a highly dealuminted FAU zeolite that has a Si/Al value of approximately 250). This was allowed to stir overnight and then 16.3 mmol if aqueous hydrofluoric acid was added (48 wt % solution, 0.68 g) and stirred until a homogenous gel was obtained. This was then allowed to evaporate water under ambient conditions until a final gel molar ratio as the composition (iv) was achieved:

$1SiO_2:0.004Al:0.5ROH:0.5HF:(4-7)H_2O$ (iv)

Figure 7:
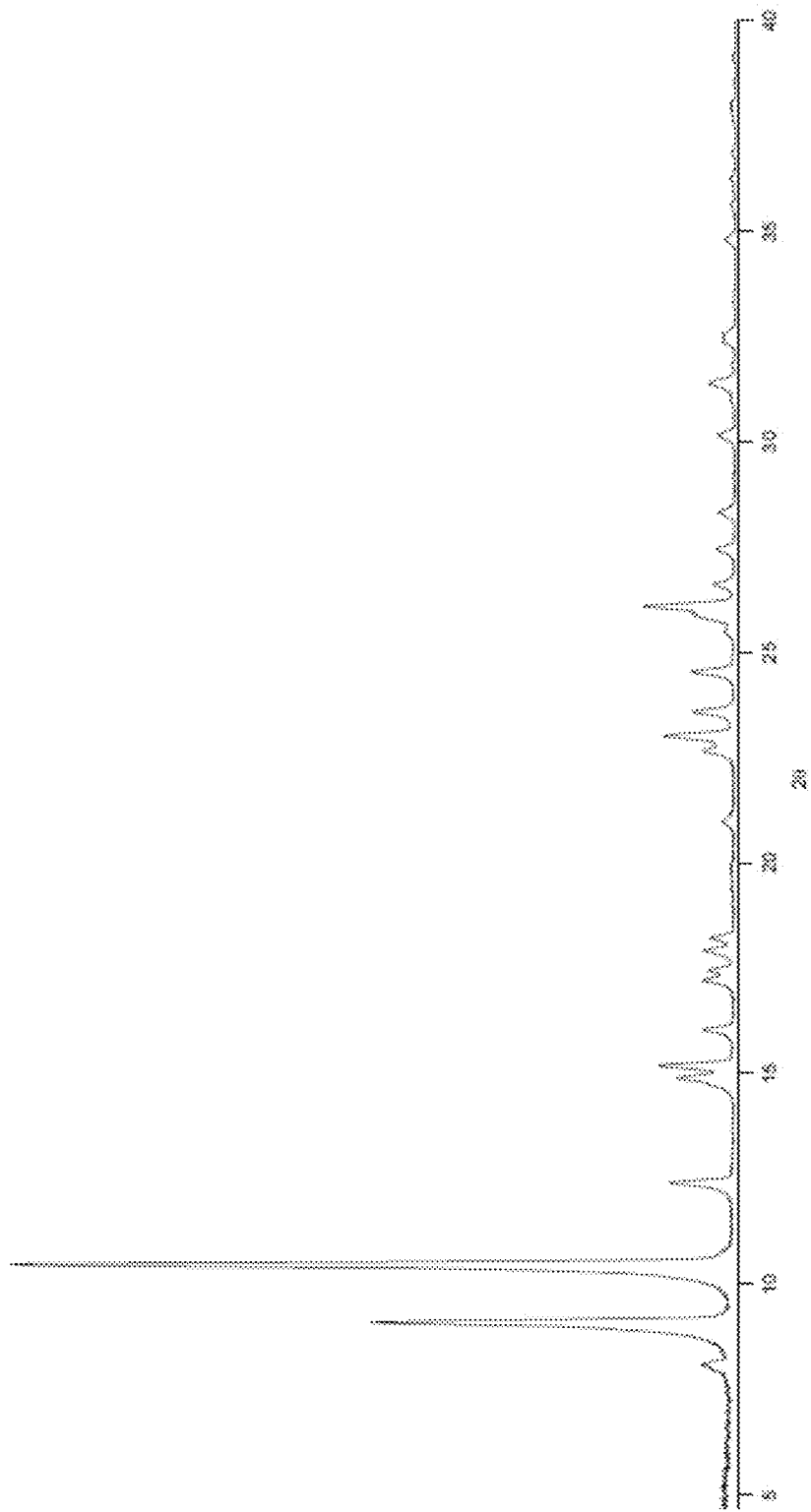
FIG. 7 shows the powder X-ray diffraction pattern of aluminosilicate STW crystalline molecular sieve from Example 10.
Figure 8A:
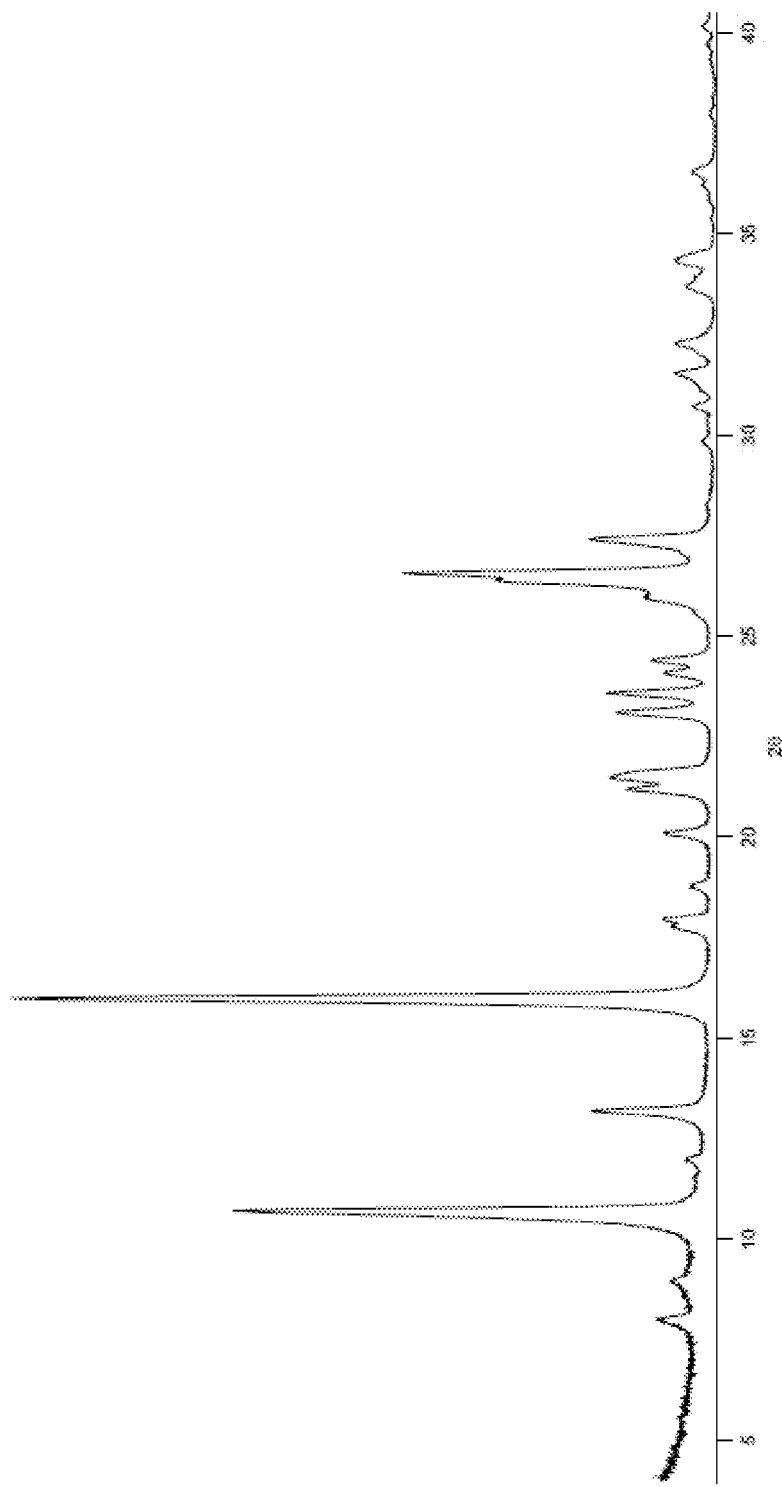
Figure 8B:
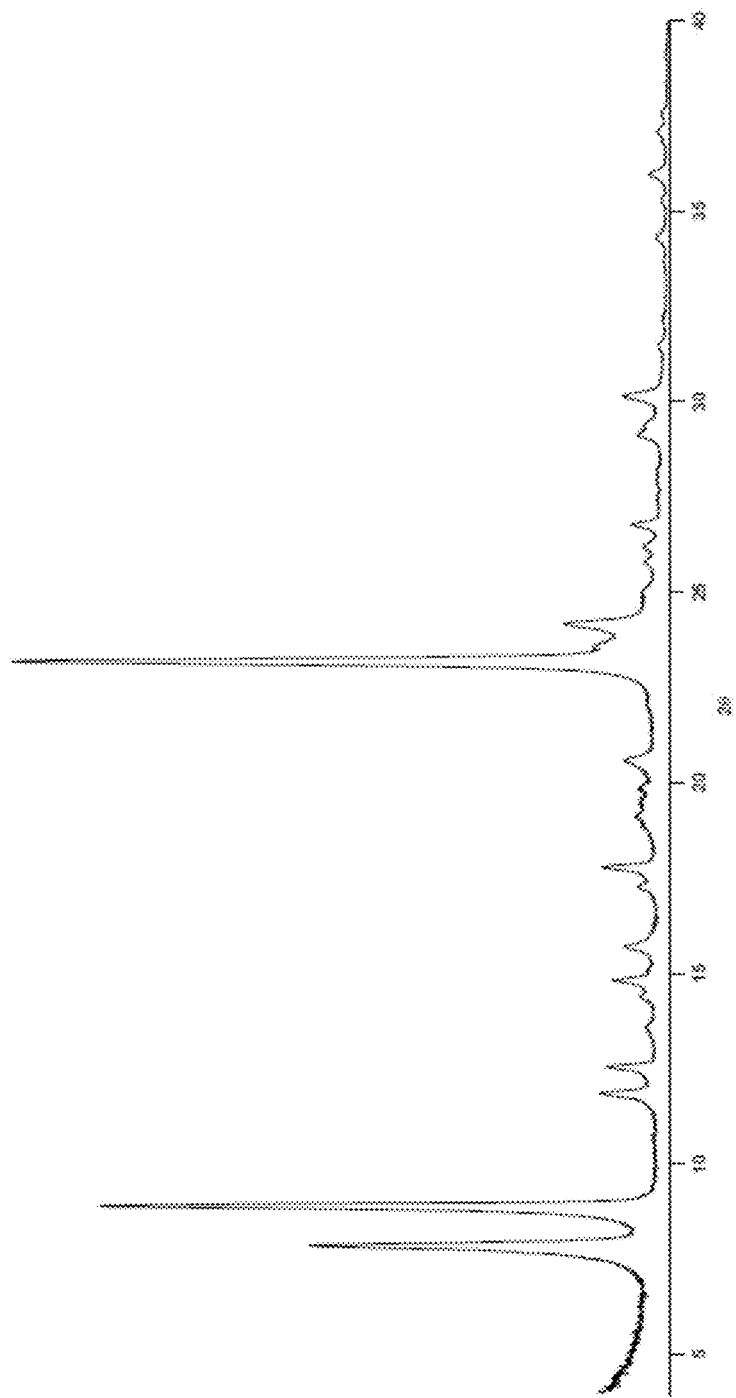
Figure 8D:
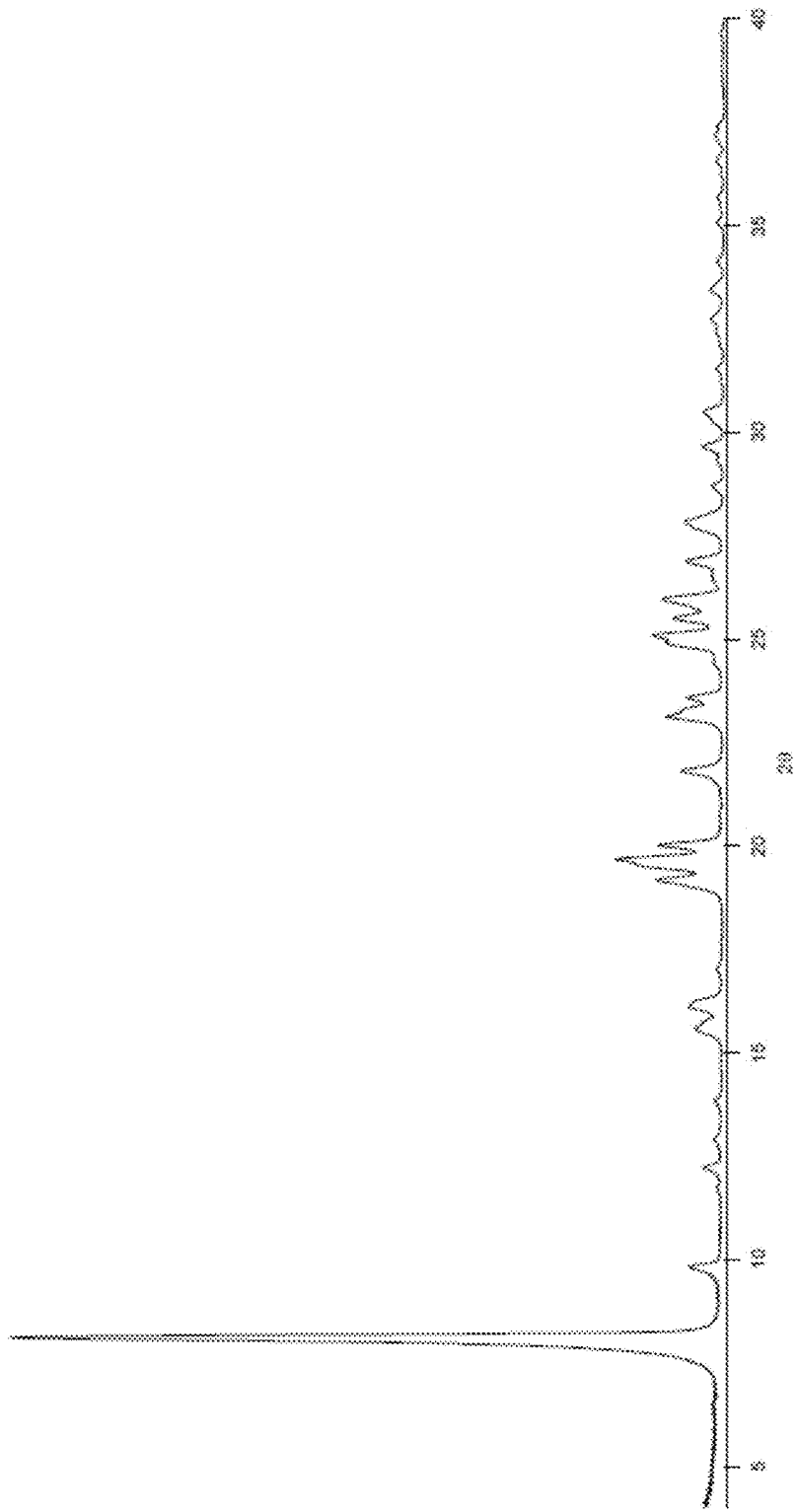
Figure 8E:
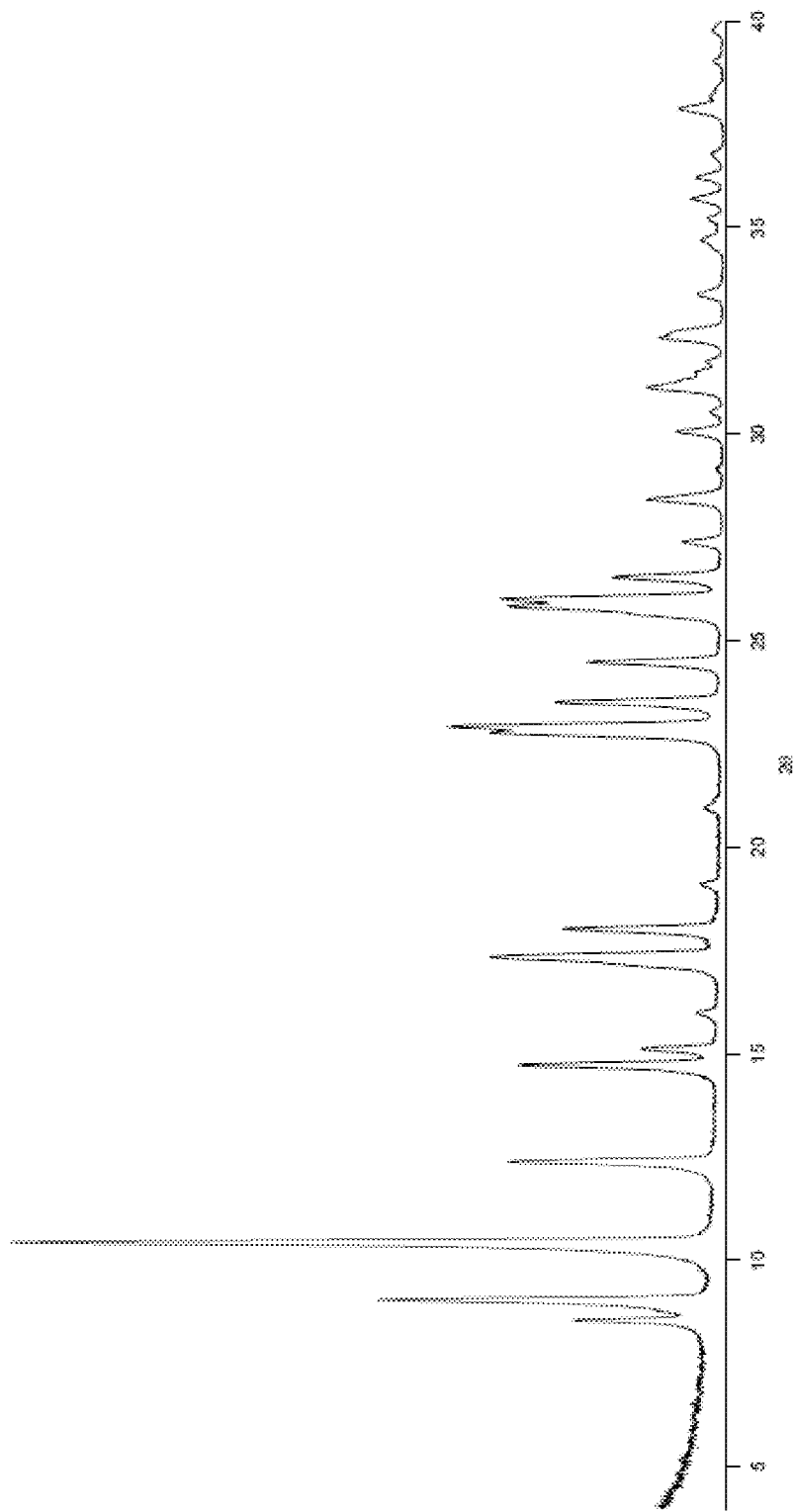
Figure 8F:
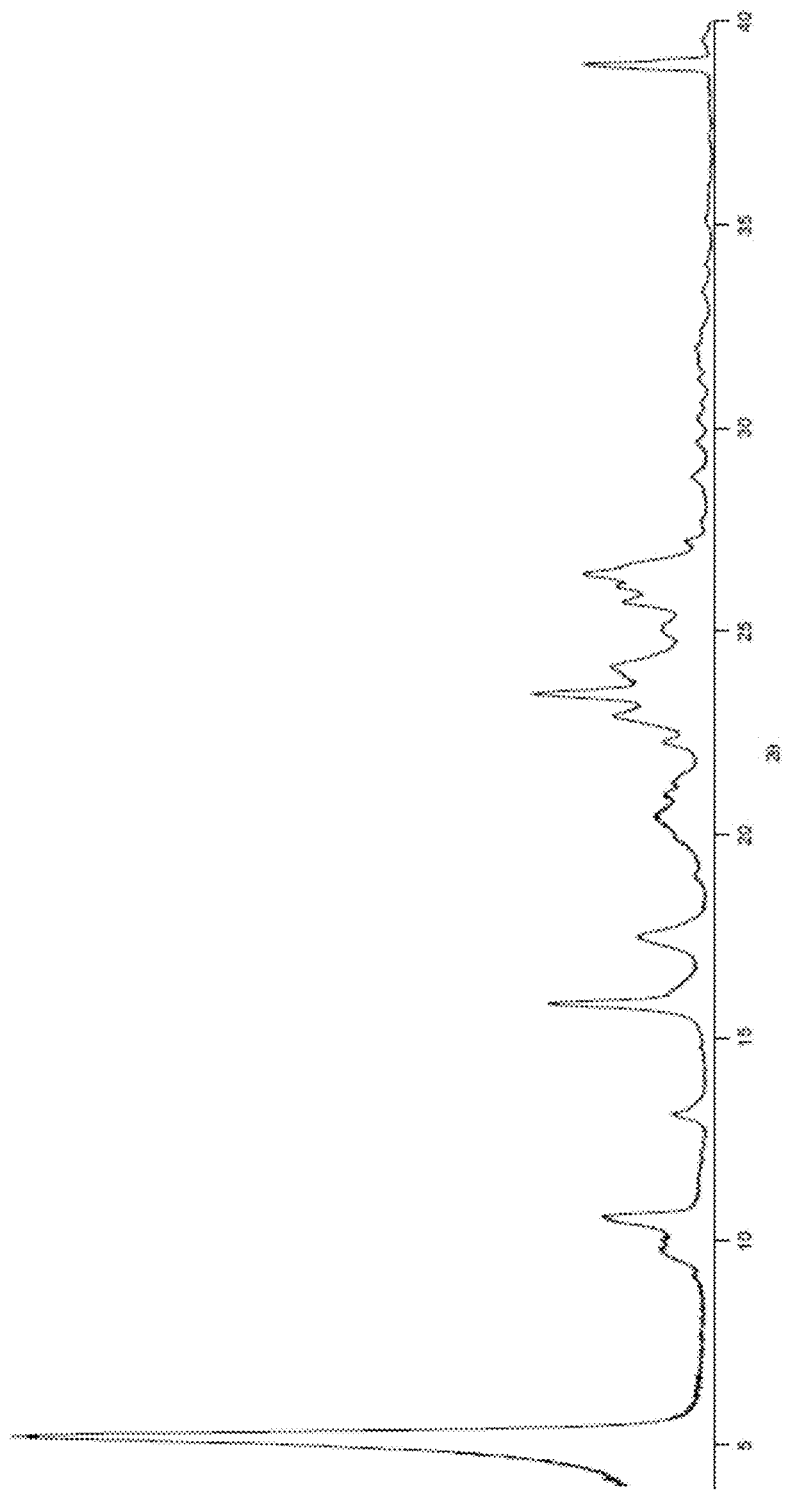

This was allowed to react at 160-175° C. tumbling until a crystalline product was obtained. FIG. 7 shows the powder X-ray diffraction patterns of the obtained aluminosilicate STW crystalline molecular sieve In the tables, the symbol "?" refers to an Unidentified Product while Amph is an abbreviation for Amorphous. The time in Tables 1-6 and 8 refers to the time when all the dioxide of the tetravalent element (Si) was consumed.

TABLE 1

Summary of experimental results for OSDA 1

| OSDA | $H_2O/SiO_2$ | Temperature (° C.) | Time | Result |
|---|---|---|---|---|
| 1 | 4 | 140 | 12 | STW |
| 1 | 7 | 140 | 23 | STW |
| 1 | 14 | 140 | 35 | ? |
| 1 | 4 | 160 | 8 | STW |
| 1 | 7 | 160 | 7 | STW |
| 1 | 14 | 160 | 7 | STW |
| 1 | 4 | 175 | 5 | STW |
| 1 | 7 | 175 | 7 | STW |
| 1 | 14 | 175 | 16 | Dense |

TABLE 2

Summary of experimental results for OSDA 2

| OSDA | $H_2O/SiO_2$ | Temperature (° C.) | Time | Result |
|---|---|---|---|---|
| 2 | 4 | 140 | 40 | STW |
| 2 | 7 | 140 | 70 | STW |
| 2 | 14 | 140 | 70 | HPM-2 |
| 2 | 4 | 160 | 16 | STW |
| 2 | 7 | 160 | 41 | STW |
| 2 | 14 | 160 | 47 | HPM-2 |
| 2 | 4 | 175 | 16 | STW |
| 2 | 7 | 175 | 20 | HPM-2 |
| 2 | 14 | 175 | 20 | Dense |

TABLE 3

Summary of experimental results for OSDA 3

| OSDA | $H_2O/SiO_2$ | Temperature (° C.) | Time | Result |
|---|---|---|---|---|
| 3 | 4 | 140 | 80 | ? |
| 3 | 7 | 140 | 74 | STF |
| 3 | 14 | 140 | 40 | MTW |
| 3 | 4 | 160 | 28 | STF |
| 3 | 7 | 160 | 21 | MTW + STF |
| 3 | 14 | 160 | 41 | MTW |
| 3 | 4 | 175 | 9 | STF |
| 3 | 7 | 175 | 21 | ? |
| 3 | 14 | 175 | 32 | MTW |

TABLE 4

Summary of experimental results for OSDA 4

| OSDA | $H_2O/SiO_2$ | Temperature (° C.) | Time | Result |
|---|---|---|---|---|
| 4 | 4 | 140 | 49 | STF |
| 4 | 7 | 140 | 49 | Amph |
| 4 | 14 | 140 | 49 | Amph |
| 4 | 4 | 160 | 16 | STW + ITW |
| 4 | 7 | 160 | 22 | ITW + MTW |
| 4 | 14 | 160 | 44 | ITW |
| 4 | 4 | 175 | 10 | ? |
| 4 | 7 | 175 | 29 | ITW |
| 4 | 14 | 175 | 21 | MTW |

TABLE 5

Summary of experimental results for OSDA 5

| OSDA | $H_2O/SiO_2$ | Temperature (° C.) | Time | Result |
|---|---|---|---|---|
| 5 | 4 | 140 | 19 | MFI + layered phase + impurity |
| 5 | 7 | 140 | 46 | Layered |
| 5 | 14 | 140 | 55 | Amph |
| 5 | 4 | 160 | 49 | MFI |
| 5 | 7 | 160 | 49 | MFI |
| 5 | 14 | 160 | 58 | Amph |
| 5 | 4 | 175 | 13 | MFI |
| 5 | 7 | 175 | 60 | Amph |
| 5 | 14 | 175 | 60 | Amph |

TABLE 6

Summary of experimental results for OSDA 6

| OSDA | $H_2O/SiO_2$ | Temperature (° C.) | Time | Result |
|---|---|---|---|---|
| 6 | 4 | 140 | 8 | STF |
| 6 | 7 | 140 | 18 | STF |
| 6 | 14 | 140 | 56 | Amph |
| 6 | 4 | 160 | 6 | STF |
| 6 | 7 | 160 | 11 | STF |
| 6 | 14 | 160 | 46 | STF |
| 6 | 4 | 175 | 5 | STF |
| 6 | 7 | 175 | 8 | STF |
| 6 | 14 | 175 | 19 | dense |

Example 12

Molecular Formulas of OSDAs (1) to (6) in STW Molecular Sieves

The OSDAs used to prepare pure-silica molecular sieves are reported in Table 7 below.

TABLE 7

Molecule

1) [structure]

2) [structure]

3) [structure]

4) [structure]

5) [structure]

6) [structure]

Synthesis reactions were conducted with OSDAs 1-6 at temperatures and $H_2O/SiO_2$ ratios typical for pure-silica, fluoride-mediated syntheses as exemplified in Examples 7 to 9. In general, reactions were allowed to proceed until a crystalline product was observed or all the reaction material had been consumed by taking aliquots for analysis. A summary of the experimental results is provided in Table 8, and a complete listing of experimental results is described herein along with the experimental and characterization details.

Representative powder X-ray diffraction (XRD) patterns for each of the as-made materials are shown in FIG. 8.

TABLE 8

Summary of experimental results

| OSDA | $H_2O/SiO_2$ | Temperature (° C.) | Time (days)* | Results |
|---|---|---|---|---|
| 1 | 4, 7 | 140, 160, 175 | 5-23 | STW |
|  | 14 | 140, 175 | 35, 16 | U, Dense |
|  | 14 | 160 | 7 | STW |

TABLE 8-continued

Summary of experimental results

| OSDA | $H_2O/SiO_2$ | Temperature (° C.) | Time (days)* | Results |
|---|---|---|---|---|
| 2 | 4 | 140, 160, 175 | 40, 16, 16 | STW |
|  | 7 | 140, 160 | 70, 41 | STW |
|  | 7 | 175 | 20 | HPM-2[22] |
|  | 14 | 140, 160 | 70, 47 | HPM-2[22] |
|  | 14 | 175 | 20 | Dense |
| 3 | 4, 7, 14 | 140, 160, 175 | 9-80 | MTW, STF, A |
| 4 | 4 | 160 | 16 | STW + ITW |
|  | 7, 14 | 160 | 22-44 | ITW, MTW |
|  | 4, 7, 14 | 140, 175 | 10-49 | ITW, MTW, STF, A |
| 5 | 4, 7, 14 | 140, 160, 175 | 13-60 | MFI, A |
| 6 | 4, 7, 14 | 140, 160, 175 | 5-56 | STF, A |

A = Amorphous, U = Unidentified *maintaining time

Example 13

Occupancy Measurement of STW Molecular Sieves

Figure 10:
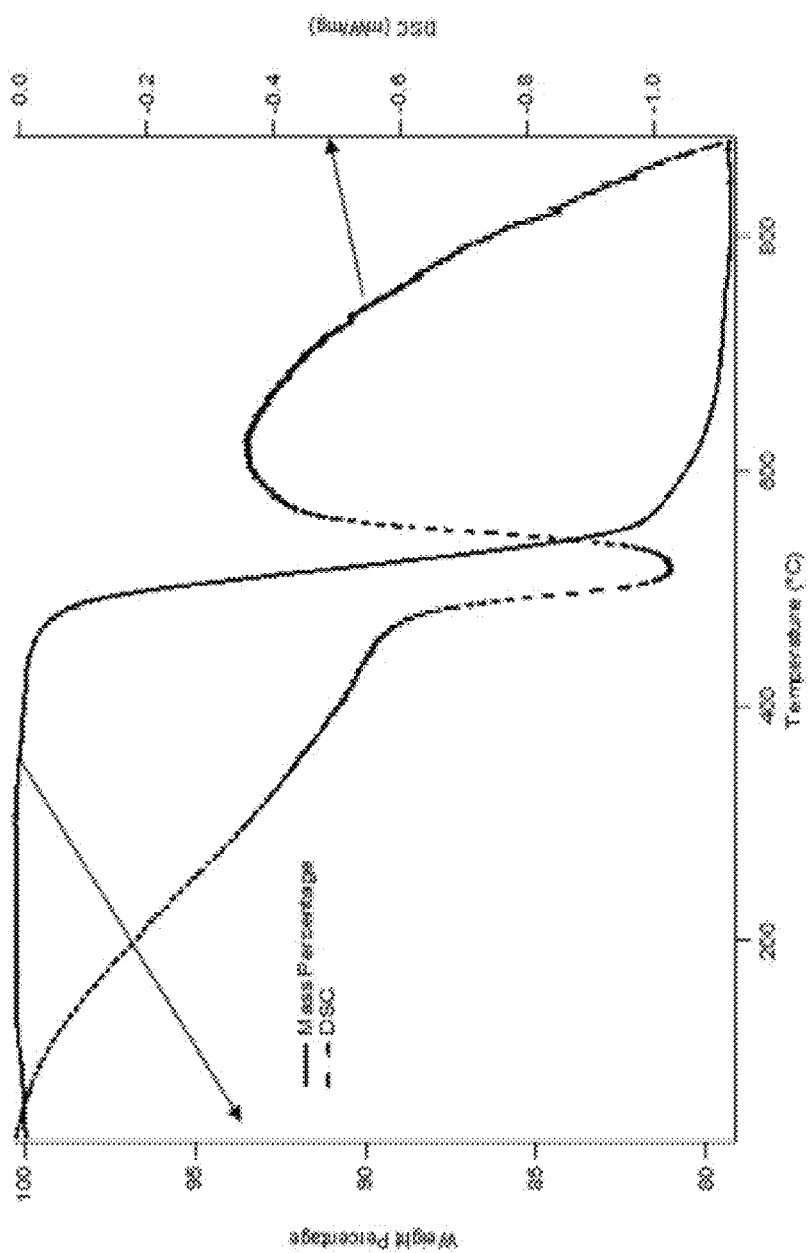
FIG. 10 shows the Thermal Gravimetric Analysis (TGA) of 1,2,3,4,5-pentamethyl-1H-imidazol-3-ium (1) molecules occluded in a STW according to one embodiment of the present disclosure.

The STW molecular sieve formed with the procedure of Example 7 was measured by Thermal Gravimetric Analysis (TGA) experiments. The results are illustrated in FIG. 10. Thermogravimetric analysis (TGA) showed that the HPM-1 made using OSDA 1 was 20.7 wt % organic and fluoride.

Example 14

Surface Area Density Measurement of STW Molecular Sieves

Figure 11:
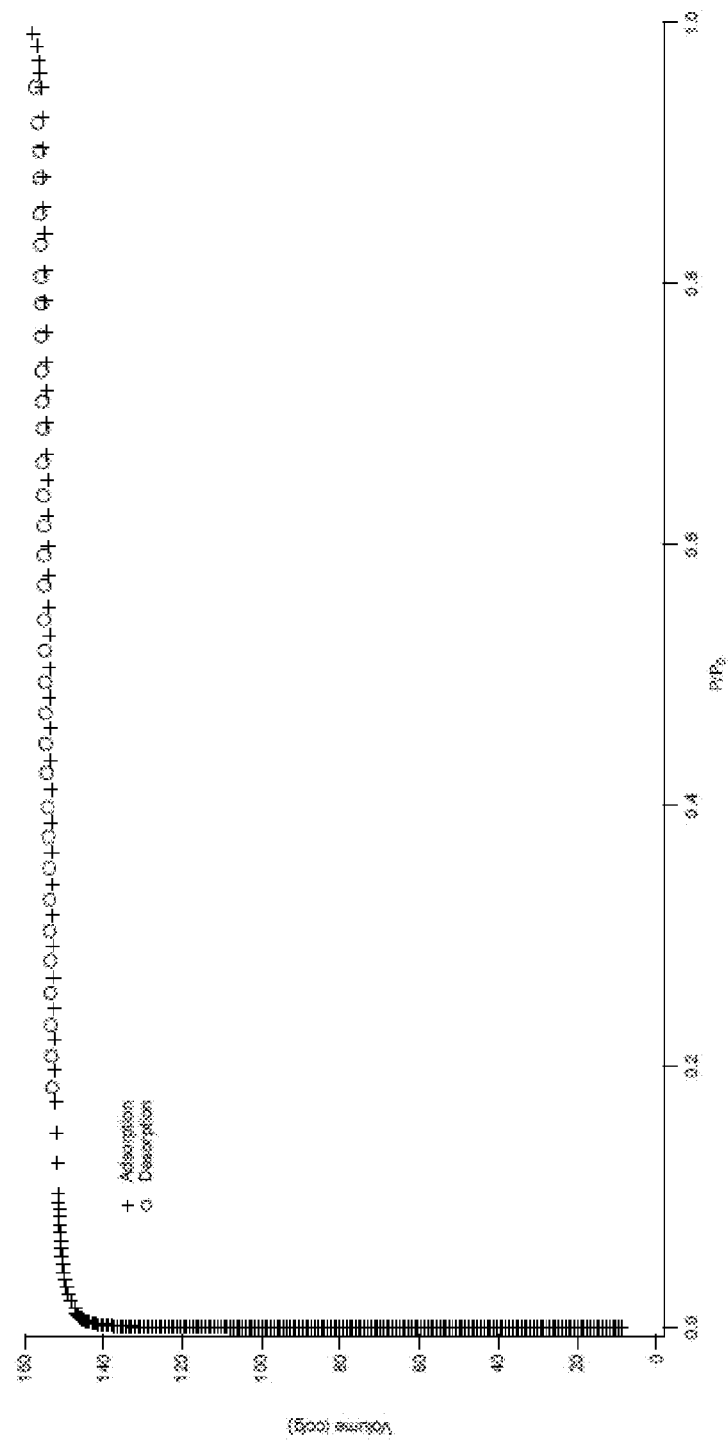
FIG. 11 shows an Argon adsorption isotherm at 87.45 K of the calcined material, i.e. pure silica molecular sieve, according to an embodiment of the present disclosure.

Additional measurements of were performed through Argon adsorption to determine the surface area density of the molecular sieve prepared with the procedure of Example 7. The results are illustrated in FIG. 11.

The examples set forth above are provided to give those of ordinary skill in the art a complete disclosure and description of how to make and use the embodiments of the molecular sieves, structure agents, methods and systems of the disclosure, and are not intended to limit the scope of what the inventors regard as their disclosure. Modifications of the above-described modes for carrying out the disclosure that are obvious to persons of skill in the art are intended to be within the scope of the following claims.

All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence. In particular, in this disclosure and in the claims that follow, reference is made to a number of terms, which shall be defined to have the following meanings:

The term "alkyl" as used herein refers to a linear, branched, or cyclic saturated hydrocarbon group typically although not necessarily containing 1 to about 4 carbon atoms such as methyl, ethyl, n-propyl, isopropyl, n-butyl, isobutyl, t-butyl and the like. If not otherwise indicated, the term alkyl includes linear, branched, cyclic, unsubstituted, substituted, and/or heteroatom-containing alkyl and lower alkyl, respectively.

The term "heteroatom" as used hereon refers an atom other than carbon, e.g., nitrogen, oxygen, sulfur, phosphorus or silicon, typically nitrogen, oxygen or sulfur. Similarly, the term "heteroaromatic" respectively refer to "aryl" and "aromatic" substituents that are heteroatom-containing, and the like.

The term "alkoxide" as used herein refers to an alkyl group bound through a single covalent bond to an oxygen anion; that is, an "alkoxide" group may be represented as alkyl-O— anion.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 6 carbon atoms such as a phenyl group.

The term "aryloxide" as used herein refers to an aryl group bound through a single covalent bond to an oxygen anion; that is, an "aryloxide" group may be represented as aryl-O⁻ anion, such as phenoxide.

The term "halogen" is used in the conventional sense to refer to a chlorine, bromine, fluorine or iodine atom.

The term "oxyhalogen" are used in the conventional sense to refer a halogen atom covalently bonded to at least one oxygen atom.

By "substituted" as used herein is meant that in the, alkyl, aryl, or other moiety, at least one hydrogen atom bound to a carbon (or other) atom is replaced with one or more non-hydrogen substituents.

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

It is to be understood that the disclosures are not limited to particular compositions or chemical systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Additionally, unless otherwise specified, the recitation of a genus of elements, materials or other components, from which an individual component or mixture of components can be selected, is intended to include all possible subgeneric combinations of the listed components and mixtures thereof. Also, "comprise," "include" and their variants, are intended to be non-limiting, such that recitation of items in a list is not to the exclusion of other like items that can also be useful in the materials, compositions and methods of this disclosure.

Although any methods and materials similar or equivalent to those described herein can be used in the practice for testing of the products, methods and system of the present disclosure, exemplary appropriate materials and methods are described herein as examples and for guidance purpose.

In particular, it will be understood that various modifications may be made without departing from the spirit and scope of the present disclosure. Accordingly, other embodiments are within the scope of the following claims.

REFERENCES

Pophale, R., F. Daeyaert, and M. W. Deem, *Computational prediction of chemically synthesizable organic structure directing agents for zeolites*. Journal of Materials Chemistry A, 2013. 1(23): p. 6750-6760.

2. Davis, M. E., *Ordered porous materials for emerging applications. Nature*, 2002. 417(6891): p. 813-21.

3. Moliner, M., F. Rey, and A. Corma, *Towards the rational design of efficient organic structure-directing agents for zeolite synthesis.* Angew Chem Int Ed Engl, 2013. 52(52): p. 13880-9.
4. Pophale, R., P. A. Cheeseman, and M. W. Deem, *A database of new zeolite-like materials.* Phys Chem Chem Phys, 2011. 13(27): p. 12407-12.
5. Vermeiren, W. and J.-P. Gilson, *Impact of zeolites on the petroleum and petrochemical industry.* Topics in Catalysis, 2009. 52(9): p. 1131-1161.
6. Zones, S., *Translating new materials discoveries in zeolite research to commercial manufacture.* Microporous and Mesoporous Materials, 2011. 144(1): p. 1-8.
7. Lin, L. C., et al., *In silico screening of carbon-capture materials.* Nat Mater, 2012. 11(7): p. 633-41.
8. Rojas, A. and M. A. Camblor, *A pure silica chiral polymorph with helical pores.* Angew Chem Int Ed Engl, 2012. 51(16): p. 3854-6.
9. Tang, L., et al., *A zeolite family with chiral and achiral structures built from the same building layer.* Nat Mater, 2008. 7(5): p. 381-5.
10. *Periodic Table Groups.* Chemical and Engineering News. 63(5): p. 27.
11. *STW.* Available from: iza-structure.org/databases.
12. Robson, H., *Verified synthesis of zeolitic materials.* 2001: Gulf Professional Publishing.
13. Navrotsky, A. P., A. N., *Methods for removing organic compounds from nano-composite materials*; U.S. Pat. No. 6,960,327 2005.
14. Zones, S.I.e.a., *Zeolite SSZ-26*; U.S. Pat. No. 4,910,006, 1990.
15. Nakagawa, Y., *Zeolite SSZ-35*; U.S. Pat. No. 5,316,753, 1994.
16. Nakagawa, Y., et al., *Guest/host relationships in zeolite synthesis: ring-substituted piperidines and the remarkable adamantane mimicry by l-azonio spino [5.5] undecanes.* Microporous and Mesoporous Materials, 1998. 22(1): p. 69-85.
17. Zones, S. I., *Molecular sieve SSZ-73 composition of matter and synthesis thereof*; U.S. Pat. No. 7,138,099 2006.
18. Hathaway, P. E. and M. E. Davis, *High resolution, quasi-equilibrium sorption studies of molecular sieves.* Catalysis Letters, 1990. 5(4-6): p. 333-347.
19. Rojas, A., et al., *Synthesis, structure, and optical activity of HPM-1, a pure silica chiral zeolite.* J Am Chem Soc, 2013. 135(32): p. 11975-84.
20. Camblor, M. A., L. Villaescusa, and M. Diaz-Cabanas, *Synthesis of all-silica and high-silica molecular sieves in fluoride media.* Topics in Catalysis, 1999. 9(1-2): p. 59-76.

The invention claimed is:

1. A method for preparing a molecular sieve having an STW framework, the method comprising:
hydrothermally treating a reaction mixture for a time and under conditions to form an as-synthesized molecular sieve having the STW framework, the reaction mixture comprising:
a first organic structure directing agent (1) having an associated organic or an inorganic anion,

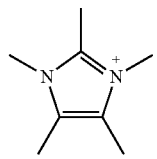

(1)

a source of an oxide of a first tetravalent element,
optionally a source of fluoride,
optionally a second organic structure directing agent, and
optionally a seed crystal having an STW framework,
the method forming the as-synthesized molecular sieve having the STW framework.

2. The method of claim 1, wherein the inorganic anion is hydroxide, fluoride, chloride, bromide, iodide, phosphate, sulfate, bisulfate, bisulfite, carbonate, bicarbonate, hexafluorophosphate, nitrate, chlorate ($ClO_3^-$), or perchlorate ($ClO_4^-$), and wherein the organic anion is a $C_{1-4}$ aliphatic carboxylate, a $C_{1-4}$ aliphatic sulfate, a $C_{1-4}$ aliphatic sulfonate, a $C_{1-4}$ alkoxide, a $C_{6-10}$ aryl carboxylate, a $C_{6-10}$ aryl sulfate, a $C_{6-10}$ aryl sulfonate, or a $C_{6-10}$ aryloxide.

3. The method of claim 1, wherein the first tetravalent element is a Group 4 element or Group 14 element of the Periodic Table.

4. The method of claim 1, wherein the first tetravalent element is silicon, germanium, titanium, tin, zirconium, cerium, or hafnium.

5. The method of claim 4, wherein the reaction mixture further comprises a source of an oxide of a trivalent element, with a molar ratio of the first tetravalent element to the trivalent element being 100:1 or higher.

6. The method of claim 4, wherein the reaction mixture further comprises a source of an oxide of a trivalent element, wherein the trivalent element is gallium, aluminum, iron, cobalt, rhodium, lanthanum, praseodymium, gadolinium, cobalt, rhodium, lanthanum, praseodymium, gadolinium, boron, titanium, vanadium, chromium, indium, thallium, scandium, or yttrium.

7. The method of claim 6, wherein the first tetravalent element is silicon and the trivalent element is aluminum.

8. The method of claim 1, wherein the first tetravalent element is silicon.

9. The method of claim 1, wherein the molar ratio of the first tetravalent element and the first organic structure directing agent is about 1 and greater.

10. The method of claim 1, wherein the molar ratio of the first tetravalent element and the first organic structure directing agent is about 10:1, about 5:1, about 2:1, or about 1:1.

11. The method of claim 1, wherein the first tetravalent element is present in the mixture with $H_2O$ in a molar ratio of $H_2O$ to the first tetravalent element in a range of from about 30:1 to about 2:1.

12. The method of claim 1, wherein the first tetravalent element is present in the mixture with $H_2O$ in a molar ratio of $H_2O$ to the first tetravalent element of about 14:1, about 7:1 or about 4:1.

13. The method of claim 1, wherein the source of fluoride is present in the mixture, and the molar ratio of the first tetravalent element to the fluoride is in a range of from about 1:1 to about 20:1.

14. The method of claim 1, wherein the source of fluoride is present in the mixture, and the molar ratio of the first tetravalent element and the fluoride is about 10:1, about 5:1, about 2:1, or about 1:1.

15. The method of claim 1, wherein the reaction mixture is maintained for the time at a temperature in a range of from about 100° C. to about 200° C.

16. The method of claim 1, wherein the time is within a range of from about 1 day to about 60 days.

17. The method of claim 1, wherein the reaction mixture further comprises a source of an oxide of a second tetravalent element and optionally a source of an oxide of a third tetravalent element, wherein each of the first, second, and third tetravalent elements is different from the other tetravalent elements.

18. The method of claim 17, wherein the second tetravalent element is a Group 4 element or a Group 14 element of the Periodic Table.

19. The method of claim 17, wherein the first tetravalent element is silicon and the second tetravalent element and the third tetravalent element are independently, germanium, titanium, tin, zirconium, cerium, or hafnium.

20. The method of claim 19, wherein the source of the oxide of a third tetravalent element is present.

21. The method of claim 1, wherein the reaction mixture further comprises a source of a second organic structure directing agent capable of directing the formation of the molecular sieve having the STW framework.

22. The method of claim 21, wherein the second organic structure directing agent is OSDA (2)

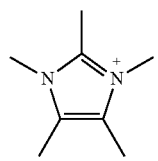

(2)

23. The method of claim 1, wherein the time is within a range of from about 3 days to about 12 days.

24. The method of claim 1, further comprising calcinating the as-synthesized molecular sieve in an oxidative atmosphere.

25. The method of claim 1, wherein the seed crystal having an STW framework is a seed crystal of the molecular sieve having an STW framework.

26. A composition mixture for synthesizing an as-synthesized molecular sieve having an STW framework, the mixture comprising:
a first organic structure directing agent (1) having an associated an organic or an inorganic anion,

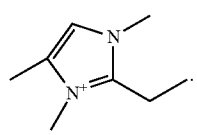

(1)

a source of an oxide of a first tetravalent element,
optionally a source of fluoride,
optionally a second organic structure directing agent, and
optionally a seed crystal having an STW framework.

27. The composition mixture of claim 26, wherein the first tetravalent element is a Group 4 element or a Group 14 element of the Periodic Table.

28. The composition mixture of claim 26, wherein the first tetravalent element is silicon, germanium, titanium, tin, zirconium, cerium or hafnium.

29. The composition mixture of claim 28, wherein the mixture further comprises a source of an oxide of a trivalent element, with a molar ratio of the first tetravalent element to the trivalent element being 100:1 or higher.

30. The composition mixture of claim 29, wherein the trivalent element is gallium, aluminum, iron, cobalt, rhodium, lanthanum, praseodymium, gadolinium, boron, titanium, vanadium, chromium, indium, thallium, scandium, or yttrium.

31. The composition mixture of claim 29, wherein the first tetravalent element is silicon and the trivalent element is aluminum.

32. The composition mixture of claim 26, wherein the first tetravalent element is silicon.

33. The composition mixture of claim 26, wherein the mixture further comprises a source of an oxide of a second tetravalent element, and optionally a source of an oxide of a third tetravalent element, wherein each of the first, second, and third tetravalent elements is different from the other tetravalent elements.

34. The composition mixture of claim 33, wherein the first tetravalent element is silicon and the second tetravalent element and the third tetravalent elements are independently germanium, titanium, tin, zirconium, cerium, or hafnium.

35. The composition mixture of claim 34, wherein the first tetravalent element is silicon and the second tetravalent element is germanium and the silicon to germanium ratio is from about 2:1 to about 3:2.

36. The composition mixture of claim 33, wherein the source of the oxide of the third tetravalent element is present, and the third tetravalent element is, germanium, titanium, tin, zirconium, cerium, or hafnium.

37. The composition mixture of claim 33, wherein the inorganic anion is hydroxide, fluoride, chloride, bromide, iodide, phosphate, sulfate, bisulfate, bisulfite, carbonate, bicarbonate, hexafluorophosphate, nitrate, chlorate ($ClO_3^-$), or perchlorate ($ClO_4^-$) and wherein the organic anion is a $C_{1-4}$ aliphatic carboxylate, a $C_{1-4}$ aliphatic sulfate, a $C_{1-4}$ aliphatic sulfonate, a $C_{1-4}$ alkoxide and a $C_{6-10}$ aryl carboxylate, a $C_{6-10}$ aryl sulfate, a $C_{6-10}$ aryl sulfonate, or a $C_{6-10}$ aryloxide.

38. An as-synthesized molecular sieve having an STW framework prepared by a process comprising hydrothermally treating a reaction mixture for a time and under conditions to form the as-synthesized molecular sieve having the STW framework, the reaction mixture comprising:
a first organic structure directing agent (1) having an associated organic or an inorganic anion,

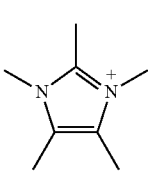

(1)

a source of an oxide of a first tetravalent element,
a source of an oxide a second tetravalent element and/or a source of an oxide of a trivalent element with a molar ratio of the second tetravalent element to the trivalent element being 100:1 or greater,
optionally a source of fluoride,
optionally a second organic structure directing agent, and
optionally a seed crystal having an STW framework, the method forming the as-synthesized molecular sieve having the STW framework.

39. The as-synthesized molecular sieve of claim 38, wherein the first tetravalent element is silicon, germanium, titanium, tin, zirconium, cerium, or hafnium;
   wherein the second tetravalent element is silicon, germanium, titanium, tin, zirconium, cerium, or hafnium and wherein the second tetravalent element is different from the first tetravalent element; and
   wherein the trivalent element is gallium, aluminum, iron, cobalt, rhodium, lanthanum, praseodymium, gadolinium, cobalt, rhodium, lanthanum, praseodymium, gadolinium, boron, titanium, vanadium, chromium, indium, thallium, scandium, or yttrium.

40. The as-synthesized molecular sieve of claim 39, wherein the first tetravalent element is silicon and the trivalent element is aluminum.

41. A molecular sieve having an STW framework, the molecular sieve having pores containing a first organic structure directing agent comprising a structure of Formula (1)

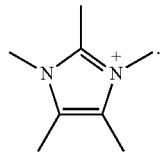

(1)

42. The method of claim 1, wherein the reaction mixture is maintained for the time at a temperature in a range of from about 140° C. to about 180° C.

* * * * *